(12) United States Patent
Watanabe et al.

(10) Patent No.: US 9,309,349 B2
(45) Date of Patent: Apr. 12, 2016

(54) TONER

(71) Applicant: CANON KABUSHIKI KAISHA, Tokyo (JP)

(72) Inventors: Shuntaro Watanabe, Hadano (JP); Takaaki Kaya, Suntou-gun (JP); Toshifumi Mori, Tokyo (JP); Kenji Aoki, Mishima (JP); Tetsuya Kinumatsu, Mishima (JP); Yusuke Kosaki, Susono (JP); Atsushi Tani, Suntou-gun (JP); Takashige Kasuya, Numazu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/669,445

(22) Filed: Mar. 26, 2015

(65) Prior Publication Data
US 2015/0274879 A1 Oct. 1, 2015

(30) Foreign Application Priority Data

Mar. 28, 2014 (JP) ................. 2014-070171

(51) Int. Cl.
| | |
|---|---|
| *C08G 18/42* | (2006.01) |
| *C08G 18/66* | (2006.01) |
| *C08G 18/75* | (2006.01) |
| *C08G 18/76* | (2006.01) |
| *G03G 9/087* | (2006.01) |
| *C08G 18/32* | (2006.01) |
| *C08L 67/00* | (2006.01) |
| *G03G 9/08* | (2006.01) |

(52) U.S. Cl.
CPC ........ *C08G 18/6607* (2013.01); *C08G 18/3212* (2013.01); *C08G 18/3215* (2013.01); *C08G 18/4238* (2013.01); *C08G 18/664* (2013.01); *C08G 18/755* (2013.01); *C08G 18/7642* (2013.01); *C08G 18/7671* (2013.01); *C08L 67/00* (2013.01); *G03G 9/0804* (2013.01); *G03G 9/08733* (2013.01); *G03G 9/08755* (2013.01); *G03G 9/08788* (2013.01); *G03G 9/08795* (2013.01); *G03G 9/08797* (2013.01)

(58) Field of Classification Search
CPC ........... C08G 18/6607; C08G 18/4238; C08G 18/3215; C08G 18/3212; C08G 18/664; C08G 18/7642; C08G 18/755; C08G 18/7671; C08G 9/0804; C08G 9/08755; C08G 9/08795; C08G 9/08788; C08G 9/08797; C08G 9/08733; C08L 67/00; C08L 67/06; C08L 75/04
See application file for complete search history.

(56) References Cited

U.S. PATENT DOCUMENTS

| | | | |
|---|---|---|---|
| 7,575,841 B2 | 8/2009 | Daimon et al. | |
| 7,794,909 B2 | 9/2010 | Kaya et al. | |
| 7,846,630 B2 | 12/2010 | Murakami et al. | |
| 8,084,174 B2 | 12/2011 | Hasegawa et al. | |
| 8,362,197 B2 | 1/2013 | Shindo et al. | |
| 8,603,712 B2 | 12/2013 | Aoki et al. | |
| 8,741,519 B2 | 6/2014 | Watanabe et al. | |
| 8,785,101 B2 | 7/2014 | Kaya et al. | |
| 8,846,284 B2 | 9/2014 | Kinumatsu et al. | |
| 2012/0021349 A1* | 1/2012 | Tani ................ | G03G 9/0821 430/109.4 |
| 2013/0130169 A1* | 5/2013 | Aoki ................ | G03G 9/08755 430/109.4 |
| 2014/0220486 A1 | 8/2014 | Kaya et al. | |
| 2014/0349232 A1 | 11/2014 | Kinumatsu et al. | |

FOREIGN PATENT DOCUMENTS

| | | |
|---|---|---|
| JP | 62-47649 A | 3/1987 |
| JP | 2010-168529 A | 8/2010 |
| JP | 4544095 B2 | 9/2010 |
| JP | 4571975 B2 | 10/2010 |

* cited by examiner

*Primary Examiner* — Robert Jones, Jr.
(74) *Attorney, Agent, or Firm* — Fitzpatrick, Cella, Harper and Scinto

(57) ABSTRACT

A toner has toner particles containing a binder resin that comprises a block polymer as a main component, obtained by chemically bonding a crystalline polyester resin with an amorphous polyurethane resin, wherein the binder resin has a specific content of a crystalline polyester resin component, and has a concentration of ester bonds derived from the crystalline polyester resin component of not more than 5.2 mmol/g, and The maximum value $E_{MAX}$ of the flexural elasticity modulus E in a three-point bending test on the toner and the strain energy u for the toner satisfy specific values.

5 Claims, 4 Drawing Sheets

TONER

BACKGROUND OF THE INVENTION

1. Field of the Invention

This invention relates to a toner for use in image-forming methods that utilize electrophotographic, electrostatic recording and toner jet recording technologies.

2. Description of the Related Art

In recent years, energy savings has been a major technical concern even in image-forming apparatuses such as electrophotographic equipment. There is, in particular, a desire for a reduction in the quantity of heat consumed by the fixing apparatus. Hence the growing need to enhance the quality referred to as "low-temperature fixability" that enables fixing to occur with the expenditure of less energy.

To enable fixing to occur at a lower temperature, one approach hitherto known to be effective is to have the binder resin included in the toner be sharp-melting. Toners which use crystalline polyester resin have been introduced as one such type of toner. Crystalline polyester resins, owing to the regular arrangement of the molecular chain, have certain characteristics: they do not exhibit a clear glass transition, are resistant to softening at temperatures below the crystal melting point, and rapidly soften above the crystal melting point. Hence, they are being studied as materials capable of providing both heat-resistant storage stability and a low-temperature fixability.

Japanese Patent Application Laid-open No. S62-47649 describes art that achieves both heat-resistant storage stability and low-temperature fixability by using as the binder a copolymer obtained by bonding crystalline polyester blocks with amorphous polyester blocks.

Japanese Patent No. 4571975 discloses art that achieves both low-temperature fixability and offset resistance by using together, as the binder resin, both a copolymer of a crystalline polyester resin with an amorphous styrene-acrylic resin, and also an amorphous styrene-acrylic resin.

Japanese Patent Application Laid-open No. 2010-168529 teaches art which achieves both heat-resistant storage stability and good melting properties by using a resin composed of crystalline segments in which an aliphatic polyester serves as an essential component, bonded with amorphous segments.

At the same time, there also exists a desire to enhance the stability of the image quality when storing images that have been output. In cases where the toner has a low strength, when the output image is rubbed by outside forces or the image itself is folded, toner is sometimes shed at the rubbed or folded areas.

Also, the toner incurs various impacts within electrophotographic equipment. For example, it incurs impacts due to the feed screws and pressure by the regulating blades within the developing device, and also incurs pressure at the blades within the cleaning device. When toner breakage and chipping arises due to such impacts, contamination of the regulating blade and filming on the photoreceptor owing to the fine powder generated as a result tend to give rise to image defects such as streaks and blank dots on the image.

Moreover, the cleaning work and parts replacement work that arise in connection with toner clogging in the cleaning zone, and the increased frequency of photoreceptor replacement associated with wear detract from the maintenance-free features of the equipment.

However, in crystalline resins, the strength of the resin itself is generally low compared with that of amorphous resins, which poses a problem in terms of the reliability of the powder. Even the above toners which use a block polymer obtained by bonding a crystalline resin with an amorphous resin have not always been able to fully address such needs.

Japanese Patent No. 4544095 describes a toner composed of a core made of a block polymer of crystalline polyester and amorphous polyester, and an amorphous polyester shell covering the core. Although this method does enable filming on the photoreceptor to be prevented to some degree, it leaves something to be desired from the standpoint of preventing breakage and chipping of the toner and enhancing toner durability over a longer period of time.

Toners that are capable of resolving the above problems have not previously been achieved, and so there has remained a desire for a toner having a higher durability.

SUMMARY OF THE INVENTION

It is therefore an object of this invention to provide a toner which is able to resolve problems such as those described above. More specifically, the object of the invention is to provide a toner which, while including a crystalline resin having a sharp melting property that is advantageous for low-temperature fixing, increases the durability to mechanical impact and is thus able to enhance stability during storage of the output image.

A further object of the invention is to provide a toner which, by enhancing the durability of the toner, reduces the breakage and chipping of toner, thus suppressing the contamination of electrophotographic equipment members caused by the generation of fine powder and preventing toner clogging in the cleaning zone, in this way enabling a high-quality image to be obtained over an extended period of time. A still further object of the invention is to provide a toner that can enhance the maintenance-free features of electrophotographic equipment.

Accordingly, the invention provides a toner having a toner particle containing a binder resin, wherein the binder resin comprises a block polymer as a main component, the a block polymer being obtained by chemically bonding a crystalline polyester resin with an amorphous polyurethane resin, wherein;

the binder resin comprises from 50.0 mass % to 85.0 mass % of a crystalline polyester resin component, and has a concentration of ester bonds derived from the crystalline polyester resin component of not more than 5.2 mmol/g, and wherein;

in a three-point bending test on a toner specimen obtained by melting the toner and molding the same to a length (l) of 30.0 mm, a width (w) of 13.0 mm and a thickness (t) of 4.0 mm, the test being carried out at a span (L) between specimen support points of 15.0 mm, when the maximum bending stress of the toner specimen determined by formula (1) below from the maximum load $F_{MAX}$(N) measured at a temperature of 25° C. is $\sigma_{MAX}$(MPa)

$$\sigma_{MAX}=(3 \times F_{MAX} \times L)/(2 \times w \times t^2) \quad (1)$$

and when the maximum value of the flexural elasticity modulus E of the toner sample determined by formula (2) below from the slope $\Delta F/\Delta s$ of a load/deflection curve is $E_{MAX}$(MPa)

$$E=L^3/(4 \times w \times t^3) \times (\Delta F/\Delta s) \quad (2),$$

$E_{MAX}$ is from 200 MPa to 450 MPa, and the strain energy u per unit volume calculated by formula (3) below from $\sigma_{MAX}$ and $E_{MAX}$ is at least 0.30 MPa.

$$u=\sigma_{MAX}^2/(2 \times E_{MAX}) \quad (3)$$

In these formulas, ΔF(N) represents the change in load between any two points selected so that the change in deflection Δs becomes 0.2 mm.

The toner of this invention, in spite of containing a crystalline resin having the sharp melting property advantageous for low-temperature fixing, increases the durability to mechanical impact and thus is able to enhance the stability of output images during storage.

Moreover, the inventive toner has an enhanced durability, thus reducing toner breakage and chipping, suppressing the contamination of electrophotographic equipment members caused by the generation of fine powder, and preventing toner clogging in the cleaning zone, which enables high-quality images to be obtained over an extended period of time. Finally, the toner of the invention is able to enhance the maintenance-free features of electrophotographic equipment.

Further features of the present invention will become apparent from the following description of exemplary embodiments (with reference to the attached drawings).

DESCRIPTION OF THE EMBODIMENTS

Following is a detailed description of preferred embodiments of the toner of the invention.

The inventors, in addressing various problems associated with the strength of toners made using the above-described crystalline polyester resins, have conducted studies focused on the strain energy per unit volume of toner.

"Strain energy" expresses energy absorption up until failure of a material when outside forces are applied to the material, and is an indicator of the toughness of the material. When the loads on a toner due to pressure and impacts have exceeded the energy allowed by the toner, breakage and chipping are thought to arise.

Figure 1:
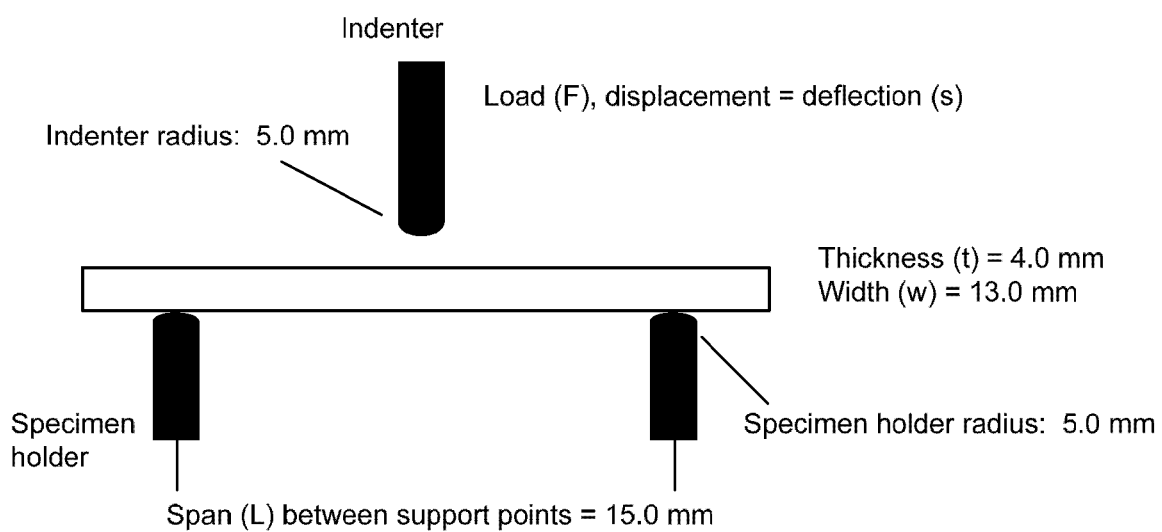
FIG. 1 is a schematic diagram showing a three-point bending test method used in toner evaluation.

One test for evaluating the strain energy per unit volume of the toner is the three-point bending test. The strain energy is measured by supporting a test specimen on both sides and applying a load at the center. FIG. 1 shows a schematic diagram illustrating the three-point bending test method.

In this invention, toner specimens molded to a length (l) of 30.0 mm, a width (w) of 13.0 mm, and a thickness (t) of 4.0 mm are used as the test specimens. The span between the specimen support points (L) is set to 15.0 mm, and measurements are carried out at a temperature of 25° C.

The maximum bending stress $\sigma_{MAX}$(MPa) of the toner sample is determined by formula (1) below from the maximum load $F_{MAX}$(N) at break.

$$\sigma_{MAX} = (3 \times F_{MAX} \times L)/(2 \times w \times t^2) \quad (1)$$

The flexural elasticity modulus E(MPa) of the toner sample is determined by formula (2) below from the slope ΔF/Δs of the load-deflection curve obtained by the above measurement. Here, ΔF(N) represents the amount of change in the load between any two points that have been selected so that the change in deflection Δs becomes 0.2 mm.

$$E = L^3/(4 \times w \times t^3) \times (\Delta F/\Delta s) \quad (2)$$

Here, the bending stress is a physical value indicating the magnitude of the forces that arise at the interior of the toner when external forces are applied to the toner, and the maximum bending stress represents the magnitude of the forces that the toner can endure when subjected to external forces. Also, "flexural elasticity modulus" is a physical value representing the resistance of the toner to deformation when external forces are applied thereto; a higher flexural elasticity modulus indicates that the toner is more resistant to deformation.

The strain energy u per unit volume of the toner sample is determined by formula (3) below from the maximum bending stress $\sigma_{MAX}$ and the maximum value $E_{MAX}$ of the flexural elasticity modulus E.

$$u = \sigma_{MAX}^2/(2 \times E_{MAX}) \quad (3)$$

The maximum bending stress of a resin is generally raised by increasing the molecular weight or by introducing a crosslinked structure. However, when the flexural elasticity modulus also rises at the same time, it ends up being difficult to increase the strain energy. The inventors have looked into this and found that even when such measures are taken with the binder resin used in the toner, a large increase in durability cannot be achieved.

Accordingly, the inventors have conducted various investigations, as a result of which they have discovered that the use of a binder resin composed primarily of a block polymer obtained by bonding a crystalline polyester resin with an amorphous polyurethane resin is effective for controlling the strain energy.

The reasons for this are thought to be as follows.

Amorphous polyurethane resins form a physically crosslinked structure between molecules due to hydrogen bonds that arise between the NH groups on the urethane bonds and the carbonyl groups. Hence, increasing the urethane bond concentration results in a larger number of crosslink points between molecules of an amorphous polyurethane resin, and is thought to enable the strain energy to be increased.

In cases where, for example, an amorphous polyester resin has been used instead of an amorphous polyurethane resin, this type of crosslinked structure does not form between the ester bonds, and so an increase in the strain energy cannot be expected.

Also, it is important that the crystalline polyester resin and the amorphous polyurethane resin form a block polymer. It is thought that the strain energy of the overall block polymer increases because the two are chemically bonded.

"Comprising a block polymer as a main component" means that the block polymer is the primary ingredient accounting for at least 50 mass % of the binder resin. The block polymer content is preferably at least 50 mass % and up to 100 mass % of the binder resin, and is more preferably at least 65 mass % and up to 100 mass %.

In this invention, by controlling the strain energy u per unit volume of toner so as to be at least 0.30 MPa, it is possible to suppress toner breakage and chipping within the developing device. The strain energy is preferably at least 0.50 MPa. Although the upper limit of the strain energy u per unit volume of toner is not particularly limited, this is generally not more than 3.0 MPa.

In addition, the inventors have conducted careful studies on the influence that the flexural elasticity modulus of a toner has on its durability.

As a result, even when the value of the toner strain energy u satisfies the condition of being at least 0.30 MPa, it has been found that if the flexural elasticity modulus is too large, the toner in the image that has been output lacks flexibility and tends to give rise to stripping of the image when it is folded or rubbed, lowering the stability of the image when it is stored. Also, when toner that has not been completely transferred to the transfer material following development on the photoreceptor is recovered with a cleaning member, the toner that has accumulated between the photoreceptor and the cleaning member firmly adheres to the photoreceptor, sometimes damaging the photoreceptor surface and, due to such damage, tends to give rise to image defects on the images that are output. In addition, it was found that toner which accumulates between the photoreceptor and the cleaning member scrapes the photoreceptor, which tends to shorten the life of the photoreceptor.

On the other hand, it was found that if the flexural elasticity modulus is too small, toner deformation readily arises, which tends to cause packing of the toner to occur between the photoreceptor and the cleaning member. The packed toner fuses to the photoreceptor, as a result of which streaks tend to arise on the image.

In this invention, by controlling the maximum value $E_{MAX}$ of the toner flexural elasticity modulus E within the range of from 200 MPa to 450 MPa, it is possible to enhance the durability of the toner.

The maximum value $E_{MAX}$ of the toner flexural elasticity modulus E is more preferably from 250 MPa to 400 MPa, and even more preferably from 300 MPa to 380 MPa.

In this invention, it is critical for the content of the crystalline polyester resin component to be from 50.0 mass % to 85.0 mass % of the binder resin. This crystalline polyester resin component includes component from the crystalline polyester resin in the block polymer and component from the crystalline polyester resin that is optionally added to the block polymer.

When the crystalline polyester resin component accounts for less than 50.0 mass % of the binder resin, the low-temperature fixability of the toner worsens; when it exceeds 85.0 mass %, hot offset readily arises on the image.

The lower limit in the content of the crystalline polyester resin component is preferably at least 60.0 mass %, and more preferably at least 70.0 mass %. The upper limit in the content of the crystalline polyester resin component is preferably not more than 82.5 mass %, and more preferably not more than 80.0 mass %.

That the resin has crystallinity is confirmed by the presence of distinct endothermic peaks in endothermic quantity measurement using a differential scanning calorimeter.

In this invention, to obtain a good electrostatic stability, it is critical for the concentration of ester bonds derived from the crystalline polyester resin component in the binder resin to be not more than 5.2 mmol/g.

The glass transition temperature of the crystalline polyester is much lower than room temperature; even if, on a macroscopic level, molecular motion appears to be limited, it is thought that, on a microscopic level, molecular motion can arise at areas of strain in the molecular arrangement due to ester bonds. Therefore, the volume resistance of the resin is thought to decrease on account of charge transfer through ester bond areas. That is, because the formation of conductive paths is suppressed by keeping the ester bond concentration in the crystalline polyester resin component low, increasing the volume resistance of the resin is possible.

When the concentration of ester bonds derived from the crystalline polyester resin component within the binder resin exceeds 5.2 mmol/g, the volume resistance of the toner decreases, as a result of which the toner has a poor electrostatic stability. The ester bond concentration is more preferably 5.0 mmol/g or less, and even more preferably 4.8 mmol/g or less. The lower limit in the ester bond concentration is preferably at least 0.5 mmol/g.

In this invention, the following methods exist for controlling the maximum value $E_{MAX}$ of the flexural elasticity modulus E.

One method is to control the ratio of the concentration of urethane bonds derived from the amorphous polyurethane resin in the block polymer to the concentration of ester bonds derived from the crystalline polyester resin (urethane bond concentration/ester bond concentration).

The inventors have discovered that there exists an approximately proportional relationship between the value of the (urethane bond concentration/ester bond concentration) ratio within the block polymer and the maximum value $E_{MAX}$ of the flexural elasticity modulus E for the toner obtained using this block polymer. That is, in order to set the maximum value $E_{MAX}$ of the toner flexural elasticity modulus to 450 MPa or less, it is preferable to set the value of the (urethane bond concentration/ester bond concentration) within the block polymer to 0.35 or less.

Methods for controlling the (urethane bond concentration/ester bond concentration) value within the block polymer to 0.35 or less include that of increasing the ester bond concentration and that of decreasing the urethane bond concentration. Methods for increasing the ester bond concentration includes the approach of increasing the ratio of the crystalline polyester resin within the block polymer and the approach of decreasing the molecular weight of the monomer making up the crystalline polyester resin.

However, if the ratio of crystalline polyester resin within the block polymer is increased too much, maintaining the elasticity of the toner at elevated temperatures becomes difficult and hot offset during toner fixing tends to arise more readily. On the other hand, if the molecular weight of the monomer making up the crystalline polyester resin is too small, the regions of the crystalline polyester resin that exhibit a regular molecular arrangement become small, as a result of which the melting point of the block polymer decreases and the heat-resistant storage stability of the toner tends to decline.

Next, method for decreasing the urethane bond concentration include the approach of lowering the ratio of amorphous polyurethane resin within the block polymer and the approach of increasing the molecular weight of the monomers making up the amorphous polyurethane resin.

However, when the ratio of amorphous polyurethane resin within the block polymer is lowered, it becomes difficult to maintain the elasticity of the toner at elevated temperatures and so hot offset tends to arise more readily.

On the other hand, with the approach of increasing the molecular weight of the monomers making up the amorphous polyurethane resin, adjusting the density of crosslink points due to hydrogen bonds between urethane bonds in the polyurethane resin is easy, enabling control of the elastic modulus of the block polymer to be suitably carried out. Therefore, the method used to control the (urethane bond concentration/ester bond concentration) value to 0.35 or less is most preferably a method carried out by adjusting the molecular weight of the monomer making up the polyurethane resin. However, even with this method, if the urethane bond concentration is lowered too much, maintaining the elasticity of the toner at elevated temperatures becomes difficult, as a result of which the hot offset resistance tends to decrease. It was found that, in this method, if the above ratio is at least 0.20, the elastic modulus of the block polymer can be controlled without allowing the hot offset resistance to decline.

Therefore, in order to set the maximum value $E_{MAX}$ of the flexural elasticity modulus E in the preferred range, it is preferable to control the (urethane bond concentration/ester bond concentration) value to from 0.20 to 0.35. It is more preferable to set this ratio to from 0.21 to 0.30, and even more preferably from 0.22 to 0.26.

The block polymer of the invention is described below.

The block polymer is a polymer in which the constituent polymers are bonded to each other by covalent bonds within a single molecule.

In this invention, the block polymer may have any of the following forms composed of a crystalline polyester resin (A) and an amorphous polyurethane resin (B): AB-type di-block polymers, ABA type tri-block polymers, BAB-type tri-block polymers, and ABAB . . . type multi-block polymers.

The crystalline polyester resin is preferably one in which an aliphatic diol and an aliphatic dicarboxylic acid, each having at least 4 but not more than 20 carbons, are used as the starting materials.

The aliphatic diol is preferably a linear molecule. A linear molecule is preferred because the crystallinity of the polyester is easily increased.

Examples of the above aliphatic diol include, but are not limited to the following, which may in some cases be used as mixtures: 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol and 1,20-eicosanediol. Of the above, from the standpoint of the melting point, 1,4-butanediol, 1,5-pentanediol and 1,6-hexanediol are preferred.

An aliphatic diol having a double bond may also be used. Illustrative examples of aliphatic diols having a double bond include the following: 2-buten-1,4-diol, 3-hexen-1,6-diol and 4-octen-1,8-diol.

From the standpoint of crystallinity, the aliphatic dicarboxylic acid is most preferably a linear dicarboxylic acid. Illustrative examples include, but are not limited to, the following, which may in some cases be used as mixtures: oxalic acid, malonic acid, succinic acid, glutaric acid, adipic acid, pimelic acid suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, 1,13-tridecanedicarboxylic acid, 1,14-tetradecanedicarboxylic acid, 1,16-hexadecanedicarboxylic acid and 1,18-octadecanedicarboxylic acid. Additional examples include lower (e.g., $C_{1-8}$) alkyl esters and acid anhydrides of these aromatic dicarboxylic acids. Of the above, sebacic acid, 1,10-decanedicarboxylic acid, 1,12-dodecanedicarboxylic acid, 1,14-tetradecanedicarboxylic acid, and lower alkyl esters or acid anhydrides thereof are preferred.

In addition to aliphatic dicarboxylic acids, aromatic carboxylic acids may also be included. Illustrative examples of aromatic dicarboxylic acids include terephthalic acid, isophthalic acid, 2,6-naphthalenedicarboxylic acid and 4,4'-biphenyldicarboxylic acid.

Of these, terephthalic acid is preferred, both because it is readily available and because it readily forms low-melting point polymers.

It is also possible to use a dicarboxylic acid having a double bond. A dicarboxylic acid having a double bond can be advantageously used to lower hot offset during fixing because the overall resin can be crosslinked using the double bond. Examples of such dicarboxylic acids include, but are not limited to, fumaric acid, maleic acid, 3-hexenedioic acid and 3-octenedioic acid. Additional examples include the lower alkyl esters and acid anhydrides of these dicarboxylic acids having a double bond. Of these, from the standpoint of cost, fumaric acid and maleic acid are preferred.

The method of preparing the crystalline polyester resin is not particularly limited. Preparation may be carried out by an ordinary polyester polymerization method that involves reacting an acid component with an alcohol component. For example, preparation may be carried out by the selective use of, depending on the type of monomers, e.g., direct polycondensation or transesterification.

Preparation of the crystalline polyester resin is preferably carried out at a polymerization temperature of at least 180° C. and not more than 230° C. Where necessary, it is preferable to set the interior of the reaction system to a reduced pressure and effect the reaction while removing water or alcohol generated during condensation. In cases where the monomers are not soluble or compatible at the reaction temperature, it is preferable to add a high-boiling solvent as a solubilizing agent to effect dissolution. In a polycondensation reaction, the reaction is carried out while distilling off the solubilizing agent. When a monomer having a poor compatibility is present in the copolymerization reaction, it is preferable to first condense the monomer having a poor compatibility with the acid or alcohol with which this monomer is to be polycondensed, and then to effect polycondensation together with the primary ingredient.

Illustrative examples of catalysts that may be used to prepare the crystalline polyester resin include titanium catalysts such as titanium tetraethoxide, titanium tetrapropoxide, titanium tetraisopropoxide and titanium tetrabutoxide; and tin catalysts such as dibutyltin dichloride, dibutyltin oxide and diphenyltin oxide.

From the standpoint of preparing the above block polymer, it is preferable for the crystalline polyester resin to be alcohol-terminated. Therefore, in the preparation of the crystalline polyester resin, the molar ratio of the acid component and the alcohol component (alcohol component/carboxylic acid component) is preferably at least 1.02 and not more than 1.20.

The amorphous polyurethane resin is a reaction product of a diol with a diisocyanate. By suitably adjusting the types of diol and diisocyanate, it is possible to obtain amorphous polyurethane resins of various functionalities.

Illustrative examples of the diisocyanate include the following: aromatic diisocyanates having at least 6 but not more than 20 carbons (excluding the carbons on the NCO groups, the same applies below), aliphatic diisocyanates having at least 2 but not more than 18 carbons, alicyclic diisocyanates having at least 4 but not more than 15 carbons, modified forms of these diisocyanates (modified forms containing a urethane group, a carbodiimide group, an allophanate group, a urea group, a biuret group, an uretdione group, an uretimine group, an isocyanurate group or an oxazolidone group; these are also referred to below as "modified diisocyanates"), as well as mixtures of two or more thereof.

Illustrative examples of the aromatic diisocyanates include m- and/or p-xylylene diisocyanate (XDI), diphenylmethane diisocyanate (MDI) and α,α,α',α'-tetramethylxylylene diisocyanate.

Illustrative examples of the aliphatic diisocyanates include ethylene diisocyanate, tetramethylene diisocyanate, hexamethylene diisocyanate (HDI) and dodecamethylene diisocyanate.

Illustrative examples of the alicyclic diisocyanates include isophorone diisocyanate (IPDI), dicyclohexylmethane-4,4'-diisocyanate, cyclohexylene diisocyanate and methylcyclohexylene diisocyanate.

Preferred examples of these include aromatic diisocyanates having at least 6 and not more than 15 carbons, aliphatic diisocyanates having at least 4 and not more than 12 carbons, and alicyclic diisocyanates having at least 4 and not more than 15 carbons. MDI, IPDI and XDI are especially preferred.

In addition to the above diisocyanates, the above amorphous polyurethane resins may also use isocyanate compounds having a functionality of 3 or more.

Diols that may be used in the above amorphous polyurethane resins include alkylene glycols (ethylene glycol, 1,2-propylene glycol, 1,3-propylene glycol), alkylene ether glycols (polyethylene glycol, polypropylene glycol), alicyclic diols (1,4-cyclohexanedimethanol), bisphenols (bisphenol A), alkylene oxide (ethylene oxide, propylene oxide) adducts of bisphenols, alkylene oxide (ethylene oxide, propylene oxide) adducts of alicyclic diols, and polyester diols.

The alkyl portion of the alkyl ether glycol may be linear or branched. In this invention, preferred use can be made of an alkylene glycol having a branched structure.

In this invention, the method of preparing the above block polymer may be one that entails separately preparing the crystalline polyester resin and the amorphous polyurethane resin, followed by a urethane formation reaction between the alcohol terminals on the crystalline polyester and the isocyanate terminals on the amorphous polyurethane. Alternatively, synthesis is possible by mixing together a crystalline polyester having alcohol terminals with the diol and the diisocyanate that make up the amorphous polyurethane and heating. In this case, at the initial stage of the reaction when the concentrations of diol and diisocyanate are high, these selectively react to form a polyurethane; once the molecular weight has become somewhat large, urethane formation between the isocyanate terminals on the polyurethane and the alcohol terminals on the crystalline polyester arises.

The above block polymer preferably contains at least 50.0 mass % and not more than 85.0 mass % of crystalline polyester resin. At a content of the crystalline polyester resin in the block polymer of 50.0 mass % or more, it is more likely for the sharp melting property of the crystalline polyester to effectively appear. This content is more preferably at least 60.0 mass % and not more than 82.5 mass %, and even more preferably at least 70.0 mass % and not more than 80.0 mass %.

Also, it is preferable for the block polymer to have a urethane bond concentration therein of at least 0.80 mmol/g and not more than 1.50 mmol/g.

By setting the urethane bond concentration to at least 0.80 mmol/g and not more than 1.50 mmol/g, the maximum value $E_{MAX}$ of the flexural elasticity modulus E of the inventive toner can be controlled to a suitable range. This concentration is more preferably at least 0.95 mmol/g, and not more than 1.25 mmol/g. The urethane bond concentration of the block polymer can be controlled by adjusting the types of diisocyanate and diol used and their amounts of addition.

It is preferable for the block polymer to have an ester bond concentration of at least 3.5 mmol/g and not more than 5.2 mmol/g.

By setting the ester bond concentration to at least 3.5 mmol/g and not more than 5.2 mmol/g, the maximum value $E_{MAX}$ of the flexural elasticity modulus E of the inventive toner can be controlled within a suitable range. The ester bond concentration is more preferably at least 4.5 mmol/g and not more than 5.0 mmol/g. The ester bond concentration of the block polymer can be controlled by adjusting the types of dicarboxylic acid and diol used and their amounts of addition.

The block polymer preferably has a number-average molecular weight (Mn) of at least 8,000 and not more than 30,000 and a weight-average molecular weight (Mw) of at least 15,000 and not more than 60,000, as measured by gel permeation chromatography (GPC) of the tetrahydrofuran (THF) soluble components. The Mn is more preferably in the range of at least 10,000 and not more than 25,000, and the Mw is more preferably in the range of at least 20,000 and not more than 50,000. The ratio Mw/Mn is preferably not more than 6, and more preferably not more than 3. The peak temperature Tm of the maximum endothermic peak measured with a differential scanning calorimeter is preferably at least 50° C. and not more than 80° C., and more preferably at least 55° C. and not more than 75° C.

Another method for controlling the maximum value $E_{MAX}$ of the flexural elasticity modulus E of the inventive toner is to use, as the binder resin, the block polymer in combination with another resin.

In cases where the block polymer is used alone, if the urethane bond concentration within the amorphous polyurethane resin is high as described above, undesirable effects may arise as a result of the flexural elasticity modulus becoming too high.

Hence, methods which involve introducing a material that mitigates interactions among urethane bonds between amorphous polyurethane molecules in the block polymer were investigated. It was thereby discovered that by using also a polyester resin in addition to the block polymer, the flexural elasticity modulus can be controlled as desired.

The polyester resin content within the binder resin is preferably at least 5.0 mass % and not more than 40.0 mass %. Within this range, satisfying the range in the maximum value $E_{MAX}$ for the flexural elasticity modulus E of the toner is easy. The range is more preferably at least 10.0 mass % and not more than 30.0 mass % of the binder resin.

In the practice of this invention, the polyester resin used together with the block polymer may be either a crystalline polyester resin or an amorphous polyester resin, although the use of a crystalline polyester resin is more preferred. By using a crystalline polyester resin together with the block polymer, it is possible to achieve the maximum value $E_{MAX}$ of the flexural elasticity modulus E of the inventive toner without detracting from the low-temperature fixability.

The crystalline polyester resin used together with the block polymer may be a resin similar to the crystalline polyester used in the block polymer.

This crystalline polyester resin, in measurement by gel permeation chromatography (GPC) of the tetrahydrofuran (THF) soluble components, preferably has a number-average molecular weight (Mn) of at least 5,000 and not more than 25,000 and a weight-average molecular weight (Mw) of at least 10,000 and not more than 50,000. The Mn is more preferably in the range of at least 8,000 and not more than 20,000, and the Mw is more preferably in the range of at least 15,000 and not more than 40,000. The ratio Mw/Mn is preferably not more than 6, and more preferably not more than 3. The peak temperature Tm of the maximum endothermic peak measured with a differential scanning calorimeter is preferably at least 50° C. and not more than 85° C., and more preferably at least 55° C. and not more than 80° C.

In the amorphous polyester resin used together with the block polymer, an aliphatic diol and/or an aromatic diol is preferably used as the alcohol component.

Illustrative examples of the aliphatic diol include 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol and 1,20-eicosanediol.

Illustrative examples of the aromatic diol include polyoxypropylene(2.2)-2,2-bis(4-hydroxyphenyl)propane and polyoxyethylene(2.2)-2,2-bis(4-hydroxyphenyl)propane.

Illustrative examples of the carboxylic acid component in the amorphous polyester resin used together with the block polymer include aromatic dicarboxylic acids such as phthalic acid, isophthalic acid, terephthalic acid, trimellitic acid and pyromellitic acid; aliphatic dicarboxylic acids such as fumaric acid, maleic acid, adipic acid, succinic acid; succinic acids substituted with an alkyl group of at least 1 and not more than 20 carbons or an alkenyl group of at least 2 and not more than 20 carbons, such as dodecenylsuccinic acid, octenylsuccinic acid; as well as anhydrides and $C_{1-8}$ alkyl esters of these acids.

From the standpoint of charging performance, the carboxylic acid preferably includes an aromatic dicarboxylic acid compound, the content of which is preferably at least 30.0 mol %, and more preferably at least 50.0 mol %, of the carboxylic acid component making up the polyester.

From the standpoint of the fixing performance, polyfunctional monomers having a functionality of three or more, such as polyhydric alcohols having a functionality of three or more and/or polycarboxylic acid compounds having a functionality of three or more, may be included in the starting monomers. The method of preparing this polyester is not particularly limited, and may be carried out in accordance with a known method. For example, use may be made of a method of preparation in which the alcohol component and the carboxylic acid component are condensation polymerized at a temperature from 180° C. to 250° C. in an inert gas atmosphere and using, if necessary, an esterification catalyst.

From the standpoint of the heat-resistant storage stability, the amorphous polyester resin used in this invention is preferably one having a glass transition temperature (Tg) of at least 50° C. When the glass transition temperature is low, the heat-resistant storage stability is sometimes poor. The glass transition temperature is more preferably at least 55° C.

One preferred embodiment of the toner particle used in the toner of the invention is a toner particle containing wax. Illustrative examples of the wax include, but are not particularly limited to, aliphatic hydrocarbon waxes such as low-molecular-weight polyethylene, low-molecular-weight polypropylene, low-molecular-weight olefin copolymers, microcrystalline wax, paraffin waxes and Fischer-Tropsch waxes; oxides of aliphatic hydrocarbon waxes such as oxidized polyethylene wax; waxes composed primarily of fatty acid esters such as aliphatic hydrocarbon-based ester waxes; partially or completely deacidified fatty acid esters, such as deacidified carnauba wax; partially esterified products of a fatty acid and a polyhydric alcohol, such as behenic acid monoglyceride; and hydroxyl group-bearing methyl ester compounds obtained by the hydrogenation of vegetable fats and oils.

Waxes especially preferred for use in this invention are aliphatic hydrocarbon waxes and ester waxes. The ester waxes used in this invention are preferably ester waxes having a functionality of 3 (trifunctional) or more, more preferably ester waxes having a functionality of 4 (tetrafunctional) or more, and even more preferably ester waxes having a functionality of 6 (hexafunctional) or more.

Here, "trifunctional ester waxes" refers to ester compounds formed by reacting the three hydroxyl groups on a trihydric alcohol (an alcohol having three hydroxyl groups) with a carboxylic acid, or to ester compounds formed by reacting the three carboxyl groups on a tricarboxylic acid (a carboxylic acid having three carboxyl groups) with an alcohol. Tetrafunctional ester waxes and hexafunctional ester waxes are similarly defined.

Ester waxes having a functionality of three or more are obtained by, for example, the condensation of an acid having a functionality of three or more with a long-chain linear saturated alcohol, or by synthesis from an alcohol having a functionality of three or more with a long-chain linear saturated fatty acid.

Illustrative examples of alcohols having a functionality of three or more that may be used in this invention include, but are not particularly limited to, the following, which in some cases may be used in admixture: glycerol, trimethylolpropane, erythritol, pentaerythritol and sorbitol. Alternatively, condensation products of these include the following obtained by the condensation of glycerol: polyglycerols such as diglycerol, triglycerol, tetraglycerol, hexaglycerol and decaglycerol; ditrimethylolpropane and tristrimethylolpropane obtained by the condensation of trimethylolpropane; and dipentaerythritol and trispentaerythritol obtained by the condensation of pentaerythritol. Of these, an alcohol having a branched structure is preferred, with pentaerythritol or dipentaerythritol being more preferred, and dipentaerythritol being especially preferred.

Long-chain linear saturated fatty acids that may be used in this invention are preferably ones of the general formula $C_nH_{2n+1}COOH$, where n is at least 5 and not more than 28. Illustrative examples include, but are not limited to, the following, which in some cases may be used in admixture: caproic acid, caprylic acid, nonanoic acid, decanoic acid, dodecanoic acid, lauric acid, tridecanoic acid, myristic acid, palmitic acid, stearic acid and behenic acid. From the standpoint of the melting point of the wax, myristic acid, palmitic acid, stearic acid and behenic acid are preferred.

Acids having a functionality of three or more that can be used in this invention include, but are not limited to, the following, which in some cases may be used in admixture: trimellitic acid, butanetetracarboxylic acid.

Long-chain linear saturated alcohols which may be used in this invention are preferably ones of the formula $C_nH_{2n+1}OH$, wherein n is at least 5 and not more than 28. Illustrative examples include, but are not limited to, the following, which in some cases may be used in admixture: capryl alcohol, lauryl alcohol, myristyl alcohol, palmityl alcohol, stearyl alcohol and behenyl alcohol. From the standpoint of the melting point of the wax, myristyl alcohol, palmityl alcohol, stearyl alcohol and behenyl alcohol are preferred.

In this invention, the wax content in the toner is preferably at least 1.0 mass % and not more than 20.0 mass %, and more preferably at least 2.0 mass % and not more than 15.0 mass %. At less than 1.0 mass %, the toner separation tends to decrease and when fixing has been carried out at a low temperature, wraparound of the transfer paper readily arises. On the other hand, at more than 20.0 mass %, wax readily becomes exposed on the toner surface, and the heat-resistant storage stability tends to decrease.

In measurement with a differential scanning calorimeter, the wax in this invention preferably has a maximum endothermic peak at a temperature from 60° C. to 120° C., and more preferably from 60° C. to 90° C. When the maximum endothermic peak is lower than 60° C., wax readily becomes exposed on the toner surface, and the heat-resistant storage stability tends to decrease. On the other hand, at a maximum endothermic peak higher than 120° C., suitable melting of the wax is less likely to occur during fixing, and the low-temperature fixability and offset resistance tend to decrease.

The toner of the invention may contain a colorant. Colorants that can be advantageously used in the invention include organic pigments, organic dyes, inorganic pigments, and black colorants such as carbon black and magnetic powder. In addition, colorants used in conventional toners may be used.

Exemplary yellow colorants include condensed azo compounds, isoindolinone compounds, anthraquinone compounds, azo metal complexes, methine compounds and allylamide compounds. Preferred examples include C.I. pigment yellow 12, 13, 14, 15, 17, 62, 74, 83, 93, 94, 95, 109, 110, 111, 128, 129, 147, 155, 168 and 180.

Exemplary magenta colorants include condensed azo compounds, diketopyrrolopyrrole compounds, anthraquinone and quinacridone compounds, basic dye lake compounds, naphthol compounds, benzimidazolone compounds, thioindigo compound and perylene compounds. Preferred examples include C.I. Pigment Red 2, 3, 5, 6, 7, 23, 48:2, 48:3, 48:4, 57:1, 81:1, 122, 144, 146, 166, 169, 177, 184, 185, 202, 206, 220, 221 and 254.

Exemplary cyan colorants include copper phthalocyanine compounds and derivatives thereof, anthraquinone compounds, and basic dye lake compounds. Preferred examples include C.I. Pigment Blue 1, 7, 15, 15:1, 15:2, 15:3, 15:4, 60, 62 and 66.

The colorant used in the toner of the invention is selected from the standpoint of hue angle, chroma, lightness, lightfastness, OHP transparency, and dispersibility in the toner.

This colorant is preferably added in an amount of at least 1.0 part by mass and not more than 20.0 parts by mass per 100 parts by mass of the binder resin. When magnetic powder is used as the colorant, the amount of addition is preferably at least 40.0 parts by mass and not more than 150.0 parts by mass per 100 parts by mass of the binder resin.

In the toner of the invention, a charge control agent may be optionally included in the toner particle, or may be externally added to the toner particle. By formulating the toner with a charge control agent, it is possible to stabilize the charge properties and control the triboelectric charge quantity so as to be optimal for the development system.

Use can be made of a known charge control agent, with a charge control agent having an especially rapid charging speed and capable of stably maintaining a constant charge quantity being preferred.

Charge control agents which control the toner so as to be negative charging are exemplified by the following: organometallic compounds and chelating compounds are effective, and include monoazo metal compounds, acetylacetone metal compounds, and also aromatic oxycarboxylic acids, aromatic dicarboxylic acids, and oxycarboxylic acid and dicarboxylic acid-type metal compounds. Charge control agents which control the toner so as to be positive charging are exemplified by the following: nigrosin, quaternary ammonium salts, metal salts of higher fatty acids, diorganotin borates, guanidine compounds and imidazole compounds. The content of the charge control agent is preferably at least 0.01 part by mass and not more than 20.0 parts by mass, and more preferably at least 0.5 part by mass and not more than 10.0 parts by mass, per 100 parts by mass of the binder resin.

The method of producing the toner particle according to this invention is not particularly limited, although toner particle formation by a dissolution suspension method is preferred. The dissolution suspension method is a method which involves preparing a resin solution of the binder resin and, if necessary, other additives dissolved or dispersed in an organic solvent, dispersing the resulting resin solution in a dispersion medium to form a dispersion of liquid particles of the resin solution, then removing the organic solvent from the dispersion of liquid particles so as to obtain the toner particles.

A dissolution suspension method which uses carbon dioxide as the dispersion medium is described below.

First, (a) a resin solution is prepared by mixing a binder resin and, if necessary, other additives together with an organic solvent capable of dissolving the binder resin. Next, (b) the resin solution is mixed together with a carbon dioxide-containing dispersion medium in which a dispersing agent has been dispersed, thereby forming drops of the resin solution (granulation). Then, (c) the organic solvent included in the liquid drops is removed, giving toner particles. The organic solvent can be removed by extracting, to the carbon dioxide phase, the organic solvent included in the liquid drops following granulation. Next, the carbon dioxide is separated off by releasing the pressure, thereby giving the toner particles. The carbon dioxide preferably used in this invention is liquid carbon dioxide or carbon dioxide in a supercritical state.

Here, "liquid carbon dioxide" refers to carbon dioxide under the temperature and pressure conditions within the region enclosed by the gas/liquid boundary line passing through the triple point (temperature=$-57°$ C., pressure=0.5 MPa) and the critical point (temperature=$31°$ C., pressure=7.4 MPa), the critical temperature isotherm, and the solid-liquid boundary line in a phase diagram for carbon dioxide. "Carbon dioxide in a supercritical state" refers to carbon dioxide under temperature and pressure conditions at or above the critical point for carbon dioxide.

The "organic solvent capable of dissolving the binder resin" is not particularly limited, so long as it is an organic solvent which can dissolve the binder resin. A solvent which, when prepared as a solution having a binder resin content of 30 mass %, contains no visually apparent insoluble matter is preferred. Illustrative examples include ketone solvents such as acetone, methyl ethyl ketone, methyl isobutyl ketone and di-n-butyl ketone; ester solvents such as ethyl acetate, butyl acetate and methoxybutyl acetate; ether solvents such as tetrahydrofuran, dioxane, ethyl cellosolve and butyl cellosolve; amide solvents such as dimethylformamide and dimethylacetamide; and aromatic hydrocarbon solvents such as toluene, xylene and ethyl benzene.

In the invention, an organic solvent may be included as another ingredient in the carbon dioxide-containing dispersion medium. In such a case, it is preferable for the carbon dioxide and the organic solvent to form a uniform phase. An example of a method for producing toner particles using carbon dioxide as the dispersion medium that is suitable for obtaining the toner particles of the invention is described below.

First, a binder resin and, if necessary, other additives such as colorants and waxes are added to an organic solvent capable of dissolving the binder resin, and the ingredients are uniformly dissolved or dispersed using a dispersing apparatus such as a homogenizer, a ball mill, a colloidal mill or an ultrasonic disperser.

The resulting resin solution is then dispersed in a carbon dioxide-containing dispersion medium, thereby forming liquid drops.

At this time, a dispersing agent is dispersed in the carbon dioxide serving as the dispersion medium. The dispersing agent may be a resin fine particle dispersing agent, an inorganic fine particle dispersing agent, or a mixture thereof. Depending on the intended purpose, two or more types of dispersing agents may be used in combination.

Examples of the resin fine particle dispersing agent include vinyl resins, urethane resins, epoxy resins, ester resins, polyamides, polyimides, silicone resins, fluororesins, phenolic resins, melamine resins, benzoguanamine resins, urea resins, aniline resins, ionomer resins, polycarbonates, cellulose and mixtures thereof.

Because the resin fine particles serving as a dispersing agent that has adsorbed to the surface of the liquid drops remain behind following toner particle formation, they form the shell phase of the toner particle.

The particle diameter of the resin fine particle dispersing agent, expressed as the number average particle diameter, is preferably at least 30 nm and not more than 300 nm, and more preferably at least 50 nm and not more than 200 nm. In cases where the particle diameter of the resin fine particles is too small, the stability of the liquid drops at the time of granulation tends to decrease. In cases where it is too large, controlling the particle diameter of the liquid drops to the desired size tends to be difficult The content of the resin fine particle dispersing agent is preferably at least 1.0 part by mass and not more than 35.0 parts by mass per 100 parts by mass of the solids in the resin solution used to form the liquid drops, and can be suitably adjusted according to the stability of the liquid drops and the desired particle diameter.

The inorganic fine particle dispersing agent is exemplified by fine particles such as silica fine particles, alumina fine particles, titania fine particles and composite oxide fine particles thereof. Silica fine particles are preferred.

Examples of methods for producing silica fine particles include a firing method in which the silica fine particles are obtained by firing a silane compound (e.g., a fumed silica production method), a deflagration method in which the silica fine particles are obtained by explosively firing a metallic silicon powder, a wet method in which the silica fine particles are obtained by a neutralization reaction between sodium silicate and a mineral acid, and a sol-gel method (the so-called Stoeber method) in which the silica fine particles are obtained by the hydrolysis of an alkoxysilane, such as hydrocarbyloxysilane. Of these, a sol-gel method, which is capable of obtaining sharper particle size distributions than other methods, is preferred.

The inorganic fine particle dispersing agent is preferably used after hydrophobic treatment to control the degree of hydrophobicity. Controlling the hydrophobicity facilitates positioning of the inorganic fine particles at the interfaces between the liquid drops and the hydrophobic dispersion medium, making it easy to enhance the dispersion stability of the liquid drops.

Illustrative examples of hydrophobic treatment agents for the inorganic fine particle dispersing agents include chlorosilanes such as methyltrichlorosilane, dimethyldichlorosilane, trimethylchlorosilane, phenyltrichlorosilane, diphenyldichlorosilane, t-butyldimethylchlorosilane and vinyltrichlorosilane; alkoxysilanes such as tetramethoxysilane, methyltrimethoxysilane, dimethyldimethoxysilane, phenyltrimethoxysilane, diphenyldimethoxysilane, o-methylphenyltrimethoxysilane, p-methylphenyltrimethoxysilane, n-butyltrimethoxysilane, i-butyltrimethoxysilane, hexyltrimethoxysilane, octyltrimethoxysilane, decyltrimethoxysilane, dodecyltrimethoxysilane, tetraethoxysilane, methyltriethoxysilane, dimethyldiethoxysilane, phenyltriethoxysilane, diphenyldiethoxysilane, i-butyltriethoxysilane, decyltriethoxysilane, vinyltriethoxysilane, γ-methacryloxypropyltrimethoxysilane, γ-glycidoxypropyltrimethoxysilane, γ-glycidoxypropylmethyldimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane and γ-(2-aminoethyl)aminopropylmethyldimethoxysilane; silazanes such as hexamethyldisilazane, hexaethyldisilazane, hexapropyldisilazane, hexabutyldisilazane, hexapentyldisilazane, hexahexyldisilazane, hexacyclohexyldisilazane, hexaphenyldisilazane, divinyltetramethyldisilazane and dimethyltetravinyldisilazane; silicone oils such as dimethyl silicone oils, methyl hydrogen silicone oils, methyl phenyl silicone oils, alkyl-modified silicone oils, chloroalkyl-modified silicone oils, chlorophenyl-modified silicone oils, fatty acid-modified silicone oils, polyether-modified silicone oils, alkoxy-modified silicone oils, carbinol-modified silicone oils, amino-modified silicone oils, fluorine-modified silicone oils and terminal-reactive silicone oils; siloxanes such as hexamethylcyclotrisiloxane, octamethylcyclotetrasiloxane, decamethylcyclopentasiloxane, hexamethyldisiloxane and octamethyltrisiloxane; and the following fatty acids and metal salts thereof: long-chain fatty acids such as undecanoic acid, lauric acid, tridecanoic acid, dodecanoic acid, myristic acid, palmitic acid, pentadecanoic acid, stearic acid, heptadecanoic acid, arachic acid, montanic acid, oleic acid, linoleic acid and arachidonic acid, and salts of these fatty acids with metals such as zinc, iron, magnesium, aluminum, calcium, sodium and lithium.

Of these, alkoxysilanes, silazanes and straight silicone oils can be advantageously used because they facilitate hydrophobic treatment. Such hydrophobic treatment agents may be used singly or as combinations of two or more thereof.

The method of hydrophobically treating the inorganic fine particles of the invention is not particularly limited. Use can be made of a known method.

In this invention, any method may be used as the method for dispersing the dispersing agent in a carbon dioxide-containing dispersion medium. An illustrative example is a method in which the dispersing agent and carbon dioxide are charged into a vessel and directly dispersed by stirring or ultrasonic irradiation. In another method, a dispersion obtained by dispersing the dispersing agent in an organic solvent is introduced with a high-pressure pump into a vessel charged with carbon dioxide.

In this invention, use can also be made of any method in which the resin solution is dispersed in a carbon dioxide-containing dispersion medium. An illustrative example is one in which the resin solution is introduced with a high-pressure pump into a vessel containing carbon dioxide in which the dispersing agent has been dispersed. Alternatively, carbon dioxide in which the dispersing agent has been dispersed may be introduced into a vessel charged with the resin solution.

In this invention, the carbon dioxide-containing dispersion medium is preferably a single phase. In cases where granulation is carried out by dispersing the resin solution in carbon dioxide, some of the organic solvent in the liquid drops migrate into the dispersion medium. If at this time the carbon dioxide phase and the organic solvent phase are present in a separated state, the stability of the liquid drops is readily lost. It is thus preferable to adjust the temperature and pressure of the dispersion medium and the amount of resin solution with respect to the carbon dioxide within ranges that enable the carbon dioxide and the organic solvent to form a uniform phase.

As for the temperature and pressure of the dispersion medium, it is preferable to take into consideration the granulating properties (ease of forming liquid drops) and the solubility in the dispersion medium of constituent ingredients within the resin solution. For example, the binder resin and wax in the resin solution may dissolve within the dispersion medium depending on the temperature conditions and pressure conditions. In general, at lower temperature and pressure, the solubility of these ingredients in the dispersion medium is suppressed, but the liquid drops that have formed readily agglomerate and coalesce, and so the granulating properties tend to decrease. On the other hand, at higher temperature and pressure, the granulating properties improve, but these ingredients tend to more readily dissolve in the dispersion medium.

Hence, in the production of the toner particle of the invention, it is preferable for the temperature of the dispersion medium to be in the temperature range of at least 10° C. and not more than 40° C.

The pressure within the vessel where the dispersion medium is formed is preferably at least 2.0 MPa and not more than 20.0 MPa, and more preferably at least 2.0 MPa and not more than 15.0 MPa. This pressure can be controlled by the amount of carbon dioxide introduced.

After the granulation step has been completed in this way, in the solvent removal step, the organic solvent remaining in the liquid drops is removed by the carbon dioxide-containing dispersion medium. This is preferably carried out by further mixing carbon dioxide-containing dispersion medium into the dispersion medium in which the liquid drops have been dispersed, extracting the residual organic solvent into the carbon dioxide phase, and further replacing this organic solvent-containing carbon dioxide with carbon dioxide.

Mixture of the dispersion medium and the carbon dioxide may be carried out by adding carbon dioxide having a higher pressure to the dispersion medium, or by adding the dispersion medium to carbon dioxide having a lower pressure.

An example of a method for further replacing the organic solvent-containing carbon dioxide with carbon dioxide entails passing carbon dioxide through the vessel while keeping the pressure within the vessel constant. At this time, such replacement is preferably carried out while trapping with a filter the toner particles that are formed.

If replacement with the carbon dioxide is insufficient and organic solvent remains present in the dispersion medium, when the vessel is depressurized to collect the toner particles that have been obtained, there are times where the organic solvent dissolved in the dispersion medium condenses, as a result of which the toner re-dissolves, or where the toner particles coalesce with each other. Therefore, substitution by carbon dioxide should be carried out until the organic solvent is completely removed. The amount of carbon dioxide that is passed through the vessel is preferably at least one time and not more than 100 times, more preferably at least one times and not more than 50 times, and even more preferably at least one times and not more than 30 times, the volume of the dispersion medium.

When the vessel is depressurized and toner particles are removed from the carbon dioxide-containing dispersion medium in which toner particles have been dispersed, depressurization to normal temperature and pressure may be carried out all at once, or depressurization may be carried out in a stepwise manner by providing independently pressure-regulated vessels at a plurality of stages. The rate of depressurization is preferably set within a range at which the toner particles do not expand.

It is possible to recycle the organic solvent and carbon dioxide used in this invention.

In this invention, the toner particles obtained may be used directly as a toner, although it is also possible to externally add an inorganic fine powder to the toner particles as a flowability improver. This inorganic fine powder has a primary particle number-average particle diameter of preferably at least 1 nm and not more than 200 nm, and more preferably at least 5 nm and not more than 150 nm.

The inorganic fine powder added to the toner particles is exemplified by silica fine powder, titania fine powder, alumina fine powder, and composite oxide fine powders thereof. Of these inorganic fine powders, a silica fine powder or a titania fine powder is preferred.

Examples of silica fine powders include fumed silica or dry silica produced by the vapor phase oxidation of a silicon halide, and wet silica produced from water glass. The inorganic fine powder is preferably a dry silica in which there are few silanol groups, and also few $Na_2O$ and $SO_3^{2-}$ groups, at the surface and at the interior of the silica fine powder. Alternatively, the dry silica may be a composite fine powder of silica and another metal oxide that has been produced by using, in the production step, aluminum chloride, titanium chloride or another metal halide together with a silicon halide compound.

By carrying out hydrophobic treatment on the inorganic fine particles and increasing the degree of hydrophobization, adjustment of the electrostatic charge on the toner, enhancement of the environmental stability and enhancement of the properties in a high-humidity environment can be achieved. It is thus more preferable to use a hydrophobic treated inorganic fine powder. When the inorganic fine powder that has been added to the toner absorbs moisture, the electrostatic charge on the toner decreases, as a result of which decreases in developability and transferability tend to arise.

Illustrative examples of the treatment agent for hydrophobic treatment of the inorganic fine powder include unmodified silicone varnishes, various types of modified silicone varnishes, unmodified silicone oils, various types of modified silicone oils, silane compounds, silane coupling agents, other organosilicon compounds and organotitanium compounds. These treatment agents may be used singly or in combination.

Of these, an inorganic fine powder that has been treated with silicone oil is preferred. More preferably, silicone oil-treated hydrophobed inorganic fine powder obtained by treating inorganic fine powder with a silicone oil, either at the same time as hydrophobic treatment with a coupling agent or following such treatment, maintains the electrostatic charge of the toner particles at a high level even in a high-humidity environment, and is desirable for reducing selective development.

The silicone oil-treated hydrophobed inorganic fine powder obtained by treating the inorganic fine powder with a silicone oil, either at the same time as hydrophobic treatment with a coupling agent or following such treatment, is added in an amount of preferably at least 0.1 part by mass and not more than 4.0 parts by mass, and more preferably at least 0.2 part by mass and not more than 3.5 parts by mass, per 100 parts by mass of the toner particles.

The toner particle according to this invention has a weight-average particle diameter (D4) of preferably at least 3.0 μm and not more than 8.0 μm, and more preferably at least 5.0 μm and not more than 7.0 μm. Using toner particles having such a weight-average particle diameter (D4) is desirable because the dot reproducibility is fully satisfied while achieving good handleability.

The toner of the invention, in gel permeation chromatographic (GPC) measurement of the tetrahydrofuran (THF) soluble matter thereof, preferably has a number-average molecular weight (Mn) of at least 8,000 and not more than 30,000, and a weight-average molecular weight (Mw) of at least 15,000 and not more than 60,000. Within this range, it is possible to impart the toner with a suitable viscoelasticity. At a Mn smaller than 8,000 and a Mw smaller than 15,000, the toner becomes too soft and the heat-resistant storage stability tends to decrease. In addition, the toner has a tendency to separate more easily from the fixed image. At a Mn larger than 30,000 and a Mw larger than 60,000, the toner becomes too hard and the fixing performance tends to decline. A more preferred range in the Mn is at least 10,000 and not more than 25,000, and a more preferred range in the Mw is at least 20,000 and not more than 50,000. In addition, it is preferable for the ratio Mw/Mn to be 6 or less. A more preferred range in the ratio Mw/Mn is 3 or less.

Methods of measuring the physical properties of the toner and toner materials of the invention are described below.

<Measurement Methods for Maximum Bending Stress, Flexural Elasticity Modulus and Strain Energy u>

Fabrication of Toner Specimen

Toner is weighed out into a mold having a length (l) of 30.0 mm and a width (w) of 13.0 mm in such a way as to have the thickness after molding become at least 4.0 mm. The toner within the mold is placed in an oven and left to stand 2 hours at a temperature of 150° C., thereby melting the toner. The power is then shut off and the toner is allowed to cool down for 12 hours. After verifying that the temperature within the oven has reached room temperature, the toner is removed. The molded toner is then cut out to a thickness (t) of 4.0 mm, thereby giving a toner specimen.

Three-Point Bending Test Measurement

A three-point bending test on the toner specimen fabricated as described above is carried out in the following way. A motorized test stand (MX2-500N) and a digital force gauge (ZP-500N), both available from Imada Co., Ltd., are used for the three-point bending test. Measurement is carried out at a temperature of 25° C. FIG. 1 shows a schematic diagram of a three-point bending test. In the diagram, the indenter has a radius of 5.0 mm, the specimen holder has a radius of 5.0 mm, and the span (L) between the support points is 15.0 mm.

The above toner specimen is placed symmetrically on a left/right pair of specimen holders with the cut-out face on the indenter side and the original, uncut face on the specimen holder side, in such a way that the center of the toner specimen in the lengthwise direction coincides with the center of the span. The indenter then applies a force to the center portion of the toner specimen in the lengthwise direction thereof.

The rate of indenter movement is set to 2.0 mm/min, and both the load F(N) acting on the indenter and the displacement (also referred to below as the "deflection") s (mm) are measured. Measurement is carried out at displacements s of from 0 mm to a maximum of 20.0 mm, and the load $F_{MAX}(N)$ up until break is recorded at 0.1 second intervals. When the break occurs elsewhere than, dividing the span into three equal portions, at the center portion of the span, the results are not used and the test is carried out again.

Figure 2:
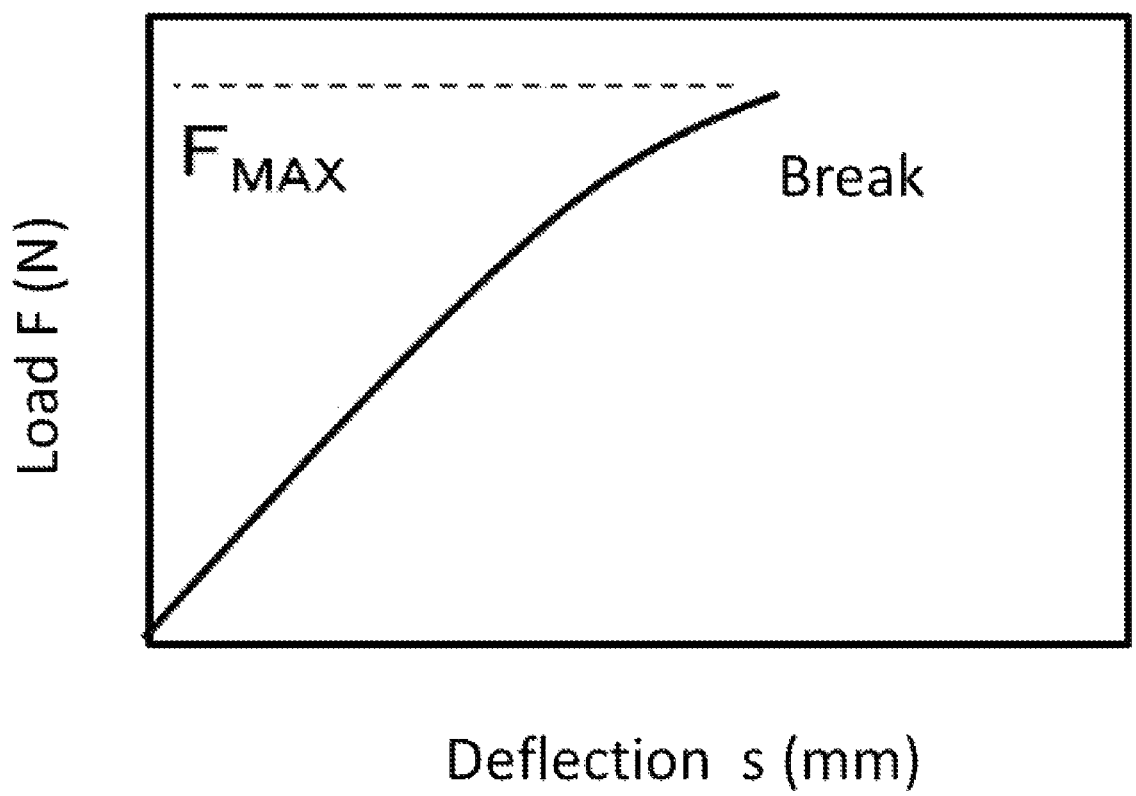
FIG. 2 is a load-deflection curve obtained by the three-point bending test used in toner evaluation.

As shown in FIG. 2, the load-deflection curve obtained by measurement is determined by using the following formulas to calculate the maximum flexural stress, the flexural elasticity modulus and the strain energy.

Maximum flexural stress $\sigma_{MAX}$(MPa):

$$\sigma_{MAX}=(3\times F_{MAX}\times L)/(2\times w\times t^2) \quad (1)$$

Flexural elasticity modulus E(MPa):

$$E=L^3/(4\times w\times t^3)\times(\Delta F/\Delta s) \quad (2)$$

Strain energy u (MPa) per unit volume:

$$u=\sigma_{MAX}^2/(2\times E_{MAX}) \quad (3)$$

($\Delta F/\Delta s$) is the slope of the load-deflection curve obtained by measurement, and $\Delta F(N)$ represents the change in the load between any two points selected so that the change in deflection $\Delta s$ becomes 0.2 mm. In measurement in this invention, the load change $\Delta F$ values in the range where, using each recorded point as the origin, $\Delta s$ becomes 0.2 mm are all determined, the flexural elasticity modulus E is measured, and the maximum value $E_{MAX}$(MPa) thereof is determined.

In measurement in this invention, ten tests are carried out and, using the method set forth in ISO 2062, the 95% confidence interval is calculated from the standard deviation of the average value. The data within the confidence interval is selected, and the average value thereof is used.

<Method of Calculating Ester Bond Concentration and Urethane Bond Concentration in Block Polymer and in Crystalline Polyester Resin Added Thereto>

Measurement of the ester bond concentration (mmol/g) and urethane bond concentration (mmol/g) in the block polymer is carried out by $^1$H-NMR under the following conditions.

Measurement apparatus: FT NMR system (JNM-EX400, from JEOL, Ltd.)

Measurement frequency: 400 MHz

Pulse conditions: 5.0 μs

Frequency range: 10,500 Hz

Number of runs: 64

Measurement temperature: 30° C.

Measurement is carried out using a sample prepared by placing 50 mg of block polymer in a sample tube having an inside diameter of 5 mm, adding heavy chloroform ($CDCl_3$) as the solvent, and dissolving this in a 40° C. thermostatic tank.

On the resulting $^1$H-NMR chart, from among the peaks attributable to the dicarboxylic acid component A (molecular weight $M_1$) and the diol component B (molecular weight $M_2$) that are constituent units of the crystalline polyester in the block polymer, those peaks that are independent of the peaks attributable to other constituent features are selected and the integrated values $S_1$, $S_2$ of these peaks are computed.

Similarly, of the peaks attributable to the diisocyanate component C (molecular weight $M_3$) and the diol component D (molecular weight $M_4$) of the amorphous polyurethane resin, those peaks that are independent of the peaks attributable to other constituent features are selected and the integrated values $S_3$, $S_4$ of these peaks are computed. The molar ratio of the respective components are determined as following using these integrated values $S_1$ to $S_4$. In addition, $n_1$ to $n_4$ are the number of hydrogens in the constituent features to which the peaks that were noticed are attributable.

The molar ratio $E_1$ (mol %) of the dicarboxylic acid component A in the crystalline polyester resin=$\{(S_1/n_1)/(S_1/n_1)+(S_2/n_2)+(S_3/n_3)+(S_4/n_4))\}\times 100$.

The molar ratio $E_2$ (mol %) of the diol component B in the crystalline polyester resin=$\{(S_2/n_2)/((S_1/n_1)+(S_2/n_2)+(S_3/n_3)+(S_4/n_4))\}\times 100$.

The molar ratio $E_3$ (mol %) of the diisocyanate component C in the amorphous polyurethane resin=$\{(S_3/n_3)/(S_1/n_1)+(S_2/n_2)+(S_3/n_3)+(S_4/n_4))\}\times 100$.

The molar ratio $E_4$ (mol %) of the diol component D in the amorphous polyurethane resin=$\{(S_4/n_4)/((S_1/n_1)+(S_2/n_2)+(S_3/n_3)+(S_4/n_4))\}\times 100$.

Next, based on the molecular weights of the respective components, the weight ratio $G_1$ of the dicarboxylic acid component A in the crystalline polyester resin within the block polymer and the weight ratio $G_3$ of the diisocyanate component C in the amorphous polyurethane resin are computed from the molar ratios for the respective components.

The weight ratio $G_1$ (mass %) of the dicarboxylic acid component A in the crystalline polyester resin=$\{(E_1\times M_1)/(E_1\times M_1)+(E_2\times M_2)+(E_3\times M_3)+(E_4\times M_4))\}\times 100$.

The weight ratio $G_3$ (mass %) of the diisocyanate component C in the amorphous polyurethane resin=$\{(E_3\times M_3)/((E_1\times M_1)+(E_2\times M_2)+(E_3\times M_3)+(E_4\times M_4))\}\times 100$.

The ester bond concentration is calculated as follows.

$$\text{Ester bond concentration (mmol/g)} = ((G_1/100)/M_1 \times 1000) \times 2$$

The urethane bond concentration is calculated as follows.

$$\text{Urethane bond concentration (mmol/g)} = ((G_3/100)/M_3 \times 1000) \times 2$$

The ester bond concentration in the added crystalline polyester resin is calculated, based on the method of calculating the ester bond concentration in the above block polymer, solely from the dicarboxylic acid component A within the crystalline polyester resin and the diol component B within the crystalline polyester resin.

<Method of Measuring Number-Average Molecular Weight (Mn) and Weight-Average Molecular Weight (Mw)>

In this invention, the molecular weights (Mn, Mw) of the tetrahydrofuran (THF)-soluble matter in the crystalline polyester resin, the block polymer and the toner are measured by gel permeation chromatography in the manner described below.

First, the sample is dissolved in THF at room temperature over a period of 24 hours. Next, the resulting solution is filtered with a solvent-resistant membrane filter having a pore size of 0.2 µm (MyShoriDisk, from Tosoh Corporation), thereby giving a sample solution. The sample solution is adjusted so that the concentration of THF-soluble components becomes about 0.8 mass %. Using this sample solution, measurement is carried out under the following conditions.

Apparatus: HLC 8120 GPC (detector: RI), from Tosoh Corporation
Columns: A series of seven columns-Shodex KF-801, 802, 803, 804, 805, 806, 807 (Showa Denko K.K.)
Eluant: tetrahydrofuran (THF)
Flow rate: 1.0 mL/min
Oven temperature: 40.0° C.
Amount of sample injected: 0.10 mL A molecular weight calibration curve prepared using standard polystyrene resins (available from Tosoh Corporation under the trade names TSK Standard Polystyrene F-850, F-450, F-288, F-128, F-80, F-40, F-20, F-10, F-4, F-2, F-1, A-5000, A-2500, A-1000 and A-500) is used to calculate the molecular weight of the sample.

<Method of Measuring Number-Average Particle Diameter of Primary Particles of Resin Fine Particles>

The number-average particle diameter of primary particles of the resin fine particles is determined by carrying out observation using a scanning electron microscope (S4700, from Hitachi, Ltd.), measuring the particle diameters of 100 particles, and treating the average value as the number-average particle diameter of the primary particles.

<Method of Measuring Particle Diameters of Colorant Particles and Wax Particles>

To measure the particle diameters of colorant particles and wax particles, a Microtrac Particle Size/Distribution Analyzer HRA (X-100, from Nikkiso) is used at a particle diameter range setting of 0.001 µm to 10 µm, and measurement is carried out as the volume-average particle diameter (µm or nm). Water is selected as the dilution solvent.

<Method of Measuring Melting Points of Crystalline Polyester, Block Polymer and Wax>

Measurement of the melting points of the crystalline polyester, block polymer and wax was carried out using a DSC Q1000 (TA Instruments) under the following conditions.
Temperature ramp-up rate: 10° C./min
Measurement starting temperature: 20° C.
Measurement end temperature: 200° C.

The melting points of indium and zinc are used for temperature calibration of the apparatus detector, and the heat of fusion of indium is used for calibrating the heat quantity. Specifically, about 2 mg of the sample is weighed out, placed in a silver pan and, using the empty silver pan as the reference, is measured. Measurement is carried out by raising the temperature once to 200° C., then lowering the temperature to 20° C., and subsequently raising the temperature to 200° C. once again. In the course of the first temperature rise in the case of the crystalline polyester and the block polymer, and in the course of the second temperature rise in the case of the wax, the peak temperature of the maximum endothermic peak in the DSC curve in the temperature range of 20° C. to 200° C. is treated as the melting point of the crystalline polyester, the block polymer and the wax.

<Method of Measuring Weight-Average Particle Diameter (D4) and Number-Average Particle Diameter (D1) of Toner Particle>

The weight-average particle diameter (D4) and number-average particle diameter (D1) of the toner particle are calculated as follows. The measurement apparatus is a precision analyzer for particle characterization based on the pore electrical resistance method and is equipped with a 100 µm aperture tube (Coulter Counter Multisizer 3®, manufactured by Beckman Coulter). Dedicated software (Beckman Coulter Multisizer 3, Version 3.51 (from Beckman Coulter)) furnished with the device is used for setting the measurement conditions and analyzing the measurement data. Measurement is carried out with the following number of effective measurement channels: 25,000.

The aqueous electrolyte solution used in measurement is one that has been obtained by dissolving guaranteed reagent grade sodium chloride in deionized water to a concentration of about 1 mass %. For example, use can be made of ISOTON II (from Beckman Coulter).

Prior to carrying out measurement and analysis, the following settings are carried out on the dedicated software. From the "Changing Standard Operating Mode (SOM)" screen of the software, select the Control Mode tab and set the Total Count to 50,000 particles, the Number of Runs to 1, and the Kd value to the value obtained using "Standard particle 10.0 µm" (Beckman Coulter). Pressing the "Threshold/Noise Level Measuring Button" automatically sets the threshold and noise levels. Set the Current to 1,600 µA, the Gain to 2 and the Electrolyte to ISOTON II, and place a check mark by "Flush aperture tube following measurement."

In the "Convert Pulse to Size Settings" screen of the software, set the Bin Spacing to "Log Diameter", the number of Size Bins to "256", and the particle size range to "from 2 µm to 60 µm".

The measurement method is as follows (1) Place about 200 mL of the aqueous electrolyte solution in a 250 mL glass round-bottomed beaker for the Multisizer 3, set the beaker on the sample stand, and carry out stirring counterclockwise with a stirrer rod at a speed of 24 rotations per second. Then use the "Aperture Flush" function in the software to remove debris and air bubbles from the aperture tube.

(2) Place about 30 mL of the aqueous electrolyte solution in a 100 mL glass flat-bottomed beaker. Add thereto about 0.3 mL of a dilution obtained by diluting the dispersant "Contaminon N" (a 10 mass % aqueous solution of a neutral (pH 7) cleanser for cleaning precision analyzers which is composed of a nonionic surfactant, an anionic surfactant and an organic builder; available from Wako Pure Chemical Industries, Ltd.) about 3-fold by mass with deionized water.

(3) Prepare for use a Tetora 150 ultrasonic dispersion system (Nikkaki Bios) having an electrical output of 120 W and equipped with two oscillators which oscillate at 50 kHz and are configured at a phase offset of 180 degrees. Place about 3.3 L of deionized water in the water tank of the system, and add about 2 mL of Contaminon N to the tank.

(4) Set the beaker prepared in (2) above in a beaker-securing hole of the ultrasonic dispersion system, and operate the system. Adjust the beaker height position so as to maximize the resonance state of the aqueous electrolyte solution liquid level within the beaker.

(5) Add about 10 mg of toner particles a little at a time to the aqueous electrolyte solution within the beaker in (4) above while subjecting the solution to ultrasonic irradiation so as to effect dispersion. Then continue ultrasonic dispersion treatment for 60 seconds while suitably regulating operation so that the water temperature in the tank is from 10° C. to 40° C.

(6) Using a pipette, carry out dropwise addition of the aqueous electrolyte solution in (5) above having toner particles dispersed therein to the round-bottomed beaker in (1) above that has been set on the sample stand, and adjust the measurement concentration to about 5%. Next, continue measurement until the number of measured particles reaches 50,000.

(7) Carry out analysis of the measurement data using the dedicated software provided with the Multisizer 3 system, and compute the weight-average particle diameter (D4) and the number-average particle diameter (D1). When "Graph/Vol %" is selected in the software program, the "average size" in the "Analysis/Volume Statistics (Arithmetic Average)" pane is the weight-average particle diameter (D4). When "Graph/Number %" is selected in the software program, the "average size" in the "Analysis/Number Statistics (Arithmetic Average)" pane is the number-average particle diameter (D1).

EXAMPLES

The invention is described more fully below by way of production examples and working examples, although the invention is in no way limited thereby. Unless noted otherwise, all references in the working examples and comparative examples to parts and % are by mass.

<Synthesis of Crystalline Polyester Resin 1>

The following starting materials were charged into a heat-dried two-neck flask while introducing nitrogen.

| | |
|---|---|
| Sebacic acid | 124.1 parts by mass |
| 1,6-Hexanediol | 75.9 parts by mass |
| Dibutyltin oxide | 0.1 part by mass |

The system interior was flushed with nitrogen by a pressure-reducing operation, following which the flask contents were stirred for 6 hours at 180° C. Next, while continuing to stir the contents, the temperature was gradually raised to 230° C. under reduced pressure and was held at this level for another 2 hours. Once the flask contents reached a viscous state, the system was air-cooled, stopping the reaction and thereby synthesizing Crystalline Polyester Resin 1. The melting point of Crystalline Polyester Resin 1 was 68° C., the Mn was 6200, and the Mw was 15,500.

<Synthesis of Crystalline Polyester Resins 2 to 9>

Crystalline Polyesters 2 to 9 were obtained by changing the materials and their amounts of addition as shown in Table 1 from those for the synthesis of Crystalline Polyester Resin 1. The physical properties of the resulting Crystalline Polyesters 2 to 9 are shown in Table 1.

TABLE 1

| | Amount added | | | | | | | Properties | | |
|---|---|---|---|---|---|---|---|---|---|---|
| | Adipic acid | Sebacic acid | 1,12-Dodecanedicarboxylic acid | 1,4-Butanediol | 1,6-Hexanediol | 1,9-Nonanediol | Dibutyltin oxide | Mn | Mw | Melting point Tm (° C.) |
| Crystalline Polyester Resin 1 | | 124.1 | | | 75.9 | | 0.1 | 6,200 | 15,500 | 68 |
| Crystalline Polyester Resin 2 | | 109.2 | | | | 90.8 | 0.1 | 6,600 | 14,800 | 75 |
| Crystalline Polyester Resin 3 | 9.4 | 125.6 | | 65.0 | | | 0.1 | 4,900 | 11,600 | 61 |
| Crystalline Polyester Resin 4 | | 136.2 | | 63.8 | | | 0.1 | 5,100 | 11,500 | 66 |
| Crystalline Polyester Resin 5 | | | 134.0 | | 66.0 | | 0.1 | 4,600 | 10,500 | 74 |
| Crystalline Polyester Resin 6 | | 125.1 | | | 74.9 | | 0.1 | 11,800 | 29,600 | 67 |
| Crystalline Polyester Resin 7 | 22.3 | 112.5 | | 65.2 | | | 0.1 | 12,300 | 31,400 | 61 |
| Crystalline Polyester Resin 8 | | | 136.0 | | 64.0 | | 0.1 | 12,800 | 33,000 | 74 |
| Crystalline Polyester Resin 9 | | 134.0 | | 66.0 | | | 0.1 | 2,500 | 4,500 | 66 |

<Synthesis of Amorphous Polyester Resin 1>

The following starting materials were charged into a heat-dried two-neck flask while introducing nitrogen.

| | |
|---|---|
| Polyoxypropylene (2.2)-2,2-bis(4-hydroxyphenyl)propane | 30.0 parts by mass |
| Polyoxyethylene (2.2)-2,2-bis(4-hydroxyphenyl)propane | 33.0 parts by mass |
| Terephthalic acid | 21.0 parts by mass |
| Trimellitic anhydride | 1.0 part by mass |
| Fumaric acid | 3.0 parts by mass |
| Dodecenylsuccinic acid | 12.0 parts by mass |
| Dibutyltin oxide | 0.1 part by mass |

The system interior was flushed with nitrogen by a pressure-reducing operation, following which the flask contents were stirred for 5 hours at 215° C. Next, while continuing to stir the contents, the temperature was gradually raised to 230° C. under reduced pressure and was held at this level for another 2 hours, causing the reaction to proceed. Once the flask contents reached a viscous state, the system was air-cooled, stopping the reaction and thereby giving Amorphous Polyester Resin 1. Amorphous Polyester Resin 1 had a Mn of 7200, a Mw of 43,000, and a glass transition temperature Tg of 63° C.

<Synthesis of Amorphous Polyester Resin 2>

The following starting materials were charged into a heat-dried two-neck flask while introducing nitrogen.

| | |
|---|---|
| Polyoxypropylene (2.2)-2,2-bis(4-hydroxyphenyl)propane | 30.0 parts by mass |
| Polyoxyethylene (2.2)-2,2-bis(4-hydroxyphenyl)propane | 34.0 parts by mass |
| Terephthalic acid | 30.0 parts by mass |
| Fumaric acid | 6.0 parts by mass |
| Dibutyltin oxide | 0.1 part by mass |

The system interior was flushed with nitrogen by a pressure-reducing operation, following which the flask contents were stirred for 5 hours at 215° C. Next, while continuing to stir the contents, the temperature was gradually raised to 230° C. under reduced pressure and was held at this level for another 5 hours, causing the reaction to proceed. Once the flask contents reached a viscous state, the system was air-cooled, stopping the reaction and thereby giving Amorphous Polyester Resin 2. Amorphous Polyester Resin 2 had a Mn of 2200, a Mw of 9800, and a glass transition temperature Tg of 60° C.

<Synthesis of Styrene-Acrylic Resin 1>

A 2-liter, four-neck flask fitted with a nitrogen inlet, a drying tube and a stirrer was charged with 500.0 parts by mass of xylene, and the temperature was raised to the xylene refluxing temperature (approx. 138° C.)

To this was added 485.0 parts by mass of styrene and 15.0 parts by mass of butyl acrylate, and 50.0 parts by mass of di-t-butyl peroxide was added dropwise as a reaction initiator to the reaction flask over a period of 5 hours. The reaction was continued in the same way for 1 more hour, following which the temperature was lowered to 98° C., 2.5 parts by mass of t-butyl peroxyoctoate was added and the reaction was carried out for 2 hours. The resulting polymerization mixture was raised to a temperature of 190° C. and the solvent was removed by pressure reduction to 8.0 kPa or below for 1 hour, thereby giving Styrene-Acrylic Resin 1. The resulting Styrene-Acrylic Resin 1 had a Mn of 2000, a Mw of 7000, and a glass transition temperature Tg of 60° C.

<Synthesis of Block Polymer 1>

| | |
|---|---|
| Crystalline Polyester Resin 1 | 225.0 parts by mass |
| Diphenylmethane diisocyanate (MDI) | 41.3 parts by mass |
| Bisphenol A 2-mole ethylene oxide adduct (BPA-2EO) | 33.8 parts by mass |
| Tetrahydrofuran (THF) | 300.0 parts by mass |

The above ingredients were charged into a reaction vessel fitted with a stirrer and a thermometer while flushing the vessel with nitrogen. After heating to 50° C. and carrying out a urethane-forming reaction over a period of 15 hours, 3.0 parts by mass of t-butyl alcohol was added, thereby modifying the isocyanate terminals. The THF serving as the solvent was then driven off, giving Block Polymer 1. The melting point, Mn and Mw of Block Polymer 1 are shown in Table 2.

The ester bond concentration and urethane bond concentration in the block polymer used were calculated by the methods described above. The ester bond concentration in the block polymer used in Toner 1 was 4.6 mmol/g, the urethane bond concentration in the overall block polymer unit was 1.10 mmol/g, and the (urethane bond concentration/ester bond concentration) ratio was 0.24.

<Synthesis of Block Polymers 2 to 31>

Block Polymers 2 to 31 were obtained by changing the materials and amounts of their addition as shown in Table 2 from those for the synthesis of Block Polymer 1. The melting points, Mn and Mw for the resulting Block Polymers 2 to 31, and the ester bond concentrations, urethane bond concentrations and (urethane bond concentration/ester bond concentration) ratios for the block polymers are shown in Table 2.

TABLE 2

| | Crystalline polyester resin | | Diisocyanate *1) | | Alcohol component *2) | | Modifier | |
|---|---|---|---|---|---|---|---|---|
| | No. | Amount added (parts by mass) | Type | Amount added (parts by mass) | Type | Amount added (parts by mass) | Type | Amount added (parts by mass)) |
| Block Polymer 1 | 1 | 225.0 | MDI | 41.3 | BPA-2EO | 33.8 | tert-butyl alcohol | 3.0 |
| Block Polymer 2 | 1 | 217.5 | MDI | 44.3 | BPA-2EO | 38.3 | tert-butyl alcohol | 3.0 |
| Block Polymer 3 | 1 | 232.6 | IPDI | 37.2 | BPA-PO | 30.2 | tert-butyl alcohol | 3.0 |
| Block Polymer 4 | 1 | 240.0 | IPDI | 34.4 | BPA-PO | 25.6 | tert-butyl alcohol | 3.0 |
| Block Polymer 5 | 1 | 225.0 | IPDI | 40.4 | BPA-PO | 34.6 | tert-butyl alcohol | 3.0 |
| Block Polymer 6 | 1 | 240.0 | IPDI | 36.8 | BPA | 23.3 | tert-butyl alcohol | 3.0 |
| Block Polymer 7 | 1 | 232.5 | IPDI | 40.1 | BPA | 27.4 | tert-butyl alcohol | 3.0 |
| Block Polymer 8 | 1 | 240.0 | MDI | 38.6 | BPA | 21.4 | tert-butyl alcohol | 3.0 |
| Block Polymer 9 | 1 | 232.5 | MDI | 42.8 | BPA | 24.8 | tert-butyl alcohol | 3.0 |
| Block Polymer 10 | 1 | 225.0 | MDI | 46.5 | BPA | 28.5 | tert-butyl alcohol | 3.0 |
| Block Polymer 11 | 1 | 240.0 | IPDI | 42.1 | CHDM | 17.9 | tert-butyl alcohol | 3.0 |
| Block Polymer 12 | 1 | 240.0 | XDI | 29.6 | BPA-2EO | 30.4 | tert-butyl alcohol | 3.0 |
| Block Polymer 13 | 1 | 225.0 | XDI | 34.9 | BPA-2EO | 40.1 | tert-butyl alcohol | 3.0 |
| Block Polymer 14 | 2 | 247.5 | XDI | 26.3 | BPA-2EO | 26.3 | tert-butyl alcohol | 3.0 |
| Block Polymer 15 | 3 | 217.5 | XDI | 38.5 | BPA-2EO | 44.0 | tert-butyl alcohol | 3.0 |
| Block Polymer 16 | 1 | 210.0 | IPDI | 46.6 | BPA-PO | 43.4 | tert-butyl alcohol | 3.0 |
| Block Polymer 17 | 1 | 210.0 | MDI | 53.9 | BPA | 36.1 | tert-butyl alcohol | 3.0 |
| Block Polymer 18 | 1 | 210.0 | XDI | 55.5 | CHDM | 34.5 | tert-butyl alcohol | 3.0 |
| Block Polymer 19 | 1 | 234.0 | XDI | 42.5 | CHDM | 23.5 | tert-butyl alcohol | 3.0 |
| Block Polymer 20 | 1 | 225.0 | XDI | 47.2 | CHDM | 27.8 | tert-butyl alcohol | 3.0 |

TABLE 2-continued

| | | | | | | | | |
|---|---|---|---|---|---|---|---|---|
| Block Polymer 21 | 1 | 195.0 | XDI | 63.8 | CHDM | 41.2 | tert-butyl alcohol | 3.0 |
| Block Polymer 22 | 1 | 180.0 | XDI | 72.0 | CHDM | 48.0 | tert-butyl alcohol | 3.0 |
| Block Polymer 23 | 1 | 240.0 | XDI | 39.2 | CHDM | 20.8 | tert-butyl alcohol | 3.0 |
| Block Polymer 24 | 1 | 270.0 | XDI | 22.3 | CHDM | 7.7 | tert-butyl alcohol | 3.0 |
| Block Polymer 25 | 2 | 180.0 | XDI | 50.6 | BPA-2EO | 69.4 | tert-butyl alcohol | 3.0 |
| Block Polymer 26 | 4 | 240.0 | XDI | 39.0 | CHDM | 21.0 | tert-butyl alcohol | 3.0 |
| Block Polymer 27 | 3 | 270.0 | XDI | 22.0 | CHDM | 8.0 | tert-butyl alcohol | 3.0 |
| Block Polymer 28 | 1 | 195.0 | IPDI | 52.9 | BPA-PO | 52.1 | tert-butyl alcohol | 3.0 |
| Block Polymer 29 | 1 | 270.0 | IPDI | 21.7 | BPA-PO | 8.3 | tert-butyl alcohol | 3.0 |
| Block Polymer 30 | 1 | 195.0 | MDI | 61.3 | BPA | 43.7 | tert-butyl alcohol | 3.0 |
| Block Polymer 31 | 1 | 270.0 | MDI | 23.5 | BPA | 6.5 | tert-butyl alcohol | 3.0 |

| | | | Properties of block polymer | | | | |
|---|---|---|---|---|---|---|---|
| | Mn | Mw | Melting point Tm [° C.] | Crystalline polyester resin content (wt %) | Ester bond concentration (mmol/g) | Urethane bond concentration (mmol/g) | (Urethane bond concentration/ Ester bond concentration) |
| Block Polymer 1 | 15000 | 33800 | 60 | 75.0 | 4.6 | 1.10 | 0.24 |
| Block Polymer 2 | 15600 | 35000 | 60 | 72.5 | 4.5 | 1.18 | 0.27 |
| Block Polymer 3 | 15500 | 34900 | 60 | 77.5 | 4.8 | 1.12 | 0.23 |
| Block Polymer 4 | 14300 | 32200 | 60 | 80.0 | 4.9 | 1.03 | 0.21 |
| Block Polymer 5 | 15500 | 34900 | 60 | 75.0 | 4.6 | 1.21 | 0.26 |
| Block Polymer 6 | 13100 | 29500 | 60 | 80.0 | 4.9 | 1.10 | 0.22 |
| Block Polymer 7 | 14200 | 32000 | 60 | 77.5 | 4.8 | 1.20 | 0.25 |
| Block Polymer 8 | 15000 | 33750 | 60 | 80.0 | 4.9 | 1.03 | 0.21 |
| Block Polymer 9 | 14500 | 32600 | 60 | 77.5 | 4.8 | 1.14 | 0.24 |
| Block Polymer 10 | 13200 | 29700 | 60 | 75.0 | 4.6 | 1.24 | 0.27 |
| Block Polymer 11 | 14600 | 32900 | 60 | 80.0 | 4.9 | 1.26 | 0.26 |
| Block Polymer 12 | 14500 | 32600 | 60 | 80.0 | 4.9 | 1.05 | 0.21 |
| Block Polymer 13 | 14800 | 33300 | 60 | 75.0 | 4.6 | 1.24 | 0.27 |
| Block Polymer 14 | 15100 | 34000 | 67 | 82.5 | 4.5 | 0.93 | 0.21 |
| Block Polymer 15 | 14200 | 31950 | 53 | 72.5 | 5.0 | 1.36 | 0.27 |
| Block Polymer 16 | 15300 | 34400 | 60 | 70.0 | 4.3 | 1.40 | 0.33 |
| Block Polymer 17 | 13700 | 30800 | 60 | 70.0 | 4.3 | 1.44 | 0.33 |
| Block Polymer 18 | 15000 | 33750 | 60 | 70.0 | 4.3 | 1.99 | 0.46 |
| Block Polymer 19 | 15800 | 35550 | 60 | 78.0 | 4.8 | 1.50 | 0.31 |
| Block Polymer 20 | 15100 | 33975 | 60 | 75.0 | 4.6 | 1.68 | 0.37 |
| Block Polymer 21 | 14900 | 33500 | 53 | 65.0 | 4.0 | 2.26 | 0.57 |
| Block Polymer 22 | 15700 | 35300 | 58 | 60.0 | 3.7 | 2.60 | 0.70 |
| Block Polymer 23 | 13800 | 31050 | 67 | 80.0 | 4.9 | 1.39 | 0.28 |
| Block Polymer 24 | 15500 | 34900 | 60 | 90.0 | 5.5 | 0.79 | 0.14 |
| Block Polymer 25 | 15600 | 35100 | 60 | 60.0 | 4.1 | 1.81 | 0.44 |
| Block Polymer 26 | 14700 | 33100 | 60 | 80.0 | 5.4 | 1.38 | 0.26 |
| Block Polymer 27 | 14500 | 32600 | 60 | 90.0 | 4.9 | 0.78 | 0.16 |
| Block Polymer 28 | 15100 | 34000 | 60 | 65.0 | 4.0 | 1.59 | 0.40 |
| Block Polymer 29 | 15500 | 34900 | 60 | 90.0 | 5.5 | 0.65 | 0.12 |
| Block Polymer 30 | 14800 | 33300 | 60 | 65.0 | 4.0 | 1.63 | 0.41 |
| Block Polymer 31 | 16000 | 36000 | 60 | 90.0 | 5.5 | 0.63 | 0.11 |

*1) MDI stands for diphenylmethane diisocyanate, IPDI stands for isophorone diisocyanate, and XDI stands for xylylene diisocyanate.
*2) BPA stands for bisphenol A, BPA-PO stands for bisphenol A 1-mole propylene oxide adduct, BPA-2EO stands for bisphenol A 2-mole ethylene oxide adduct, and CHDM stands for cyclohexane dimethanol.

<Synthesis of Block Polymer 32>

| Crystalline Polyester Resin 5 | 160.0 parts by mass |
|---|---|
| Amorphous Polyester Resin 1 | 40.0 parts by mass |

The above ingredients were charged into a reaction vessel fitted with a stirrer and a thermometer while flushing the vessel with nitrogen. The system was heated to 200° C. and an esterification reaction was carried out over a period of 5 hours, giving Block Polymer 32. Block Polymer 32 had a melting point of 66° C., a Mn of 13,100, and a Mw of 32,200.

In addition, the ester bond concentration and urethane bond concentration in the block polymer were calculated by the methods described above. The ester bond concentration in Block Polymer 32 was 1.7 mmol/g.

<Synthesis of Block Polymer 33>

A 4-liter, four-neck flask fitted with a nitrogen inlet, a drying tube and a stirrer was charged with 500.0 parts by mass of Crystalline Polyester 1 and 7.2 parts by mass of maleic anhydride. The flask contents were reacted at 150° C. for 2 hours, giving a maleic acid adduct. Next, the flask was charged with 500.0 parts by mass of xylene, 490.0 parts by mass of styrene and 10.0 parts by mass of methacrylic acid and the temperature was raised to 85° C., following which 3.0 parts by mass of t-butyl peroxyoctoate was added and the reaction was carried out for 4 hours. In addition, 1.0 part by mass of t-butyl peroxyoctoate was added and the reaction was carried out for 2 hours. This was repeated three time, giving Block Polymer 33. Block Polymer 33 had a melting point of 60° C., a Mn of 20,000 and a Mw of 70,000.

The ester bond concentration and urethane bond concentration of the block polymer were calculated by the methods described above. The ester bond concentration in Block Polymer 33 was 3.1 mmol/g.

<Preparation of Binder Resin Solution 1>

A beaker equipped with a stirrer was charged with 100.0 parts by mass of acetone and 100.0 parts by mass of Block Polymer 1, and stirring was continued at a temperature of 40° C. until the block polymer completely dissolved, thereby giving Binder Resin Solution 1.

<Preparation of Binder Resin Solutions 2 to 42>

Binder Resin Solutions 2 to 42 were obtained by changing the materials and the amounts of their addition as shown in Table 3 from those in the preparation of Binder Resin Solution 1.

TABLE 3

|  | Binder Resin 1 | | Binder Resin 2 | |
| --- | --- | --- | --- | --- |
|  | Type | Amount added | Type | Amount added |
| Binder Resin Solution 1 | Block Polymer 1 | 100.0 | — | — |
| Binder Resin Solution 2 | Block Polymer 2 | 100.0 | — | — |
| Binder Resin Solution 3 | Block Polymer 3 | 100.0 | — | — |
| Binder Resin Solution 4 | Block Polymer 4 | 100.0 | — | — |
| Binder Resin Solution 5 | Block Polymer 5 | 100.0 | — | — |
| Binder Resin Solution 6 | Block Polymer 6 | 100.0 | — | — |
| Binder Resin Solution 7 | Block Polymer 7 | 100.0 | — | — |
| Binder Resin Solution 8 | Block Polymer 8 | 100.0 | — | — |
| Binder Resin Solution 9 | Block Polymer 9 | 100.0 | — | — |
| Binder Resin Solution 10 | Block Polymer 10 | 100.0 | — | — |
| Binder Resin Solution 11 | Block Polymer 11 | 100.0 | — | — |
| Binder Resin Solution 12 | Block Polymer 12 | 100.0 | — | — |
| Binder Resin Solution 13 | Block Polymer 13 | 100.0 | — | — |
| Binder Resin Solution 14 | Block Polymer 14 | 100.0 | — | — |
| Binder Resin Solution 15 | Block Polymer 15 | 100.0 | — | — |
| Binder Resin Solution 16 | Block Polymer 16 | 100.0 | — | — |
| Binder Resin Solution 17 | Block Polymer 17 | 100.0 | — | — |
| Binder Resin Solution 18 | Block Polymer 18 | 80.0 | Crystalline Polyester Resin 6 | 20.0 |
| Binder Resin Solution 19 | Block Polymer 18 | 84.0 | Crystalline Polyester Resin 6 | 16.0 |
| Binder Resin Solution 20 | Block Polymer 18 | 67.0 | Crystalline Polyester Resin 6 | 33.0 |
| Binder Resin Solution 21 | Block Polymer 19 | 95.0 | Crystalline Polyester Resin 6 | 5.0 |
| Binder Resin Solution 22 | Block Polymer 20 | 90.0 | Crystalline Polyester Resin 6 | 10.0 |
| Binder Resin Solution 23 | Block Polymer 21 | 60.0 | Crystalline Polyester Resin 6 | 40.0 |
| Binder Resin Solution 24 | Block Polymer 22 | 52.0 | Crystalline Polyester Resin 6 | 48.0 |
| Binder Resin Solution 25 | Block Polymer 23 | 80.0 | Amorphous Polyester Resin 2 | 20.0 |
| Binder Resin Solution 26 | Block Polymer 23 | 95.0 | Amorphous Polyester Resin 2 | 5.0 |
| Binder Resin Solution 27 | Block Polymer 23 | 66.0 | Amorphous Polyester Resin 2 | 34.0 |
| Binder Resin Solution 28 | Block Polymer 18 | 80.0 | Crystalline Polyester Resin 7 | 20.0 |
| Binder Resin Solution 29 | Block Polymer 18 | 80.0 | Crystalline Polyester Resin 8 | 20.0 |
| Binder Resin Solution 30 | Block Polymer 23 | 80.0 | Crystalline Polyester Resin 6 | 20.0 |
| Binder Resin Solution 31 | Block Polymer 18 | 100.0 | — | — |
| Binder Resin Solution 32 | Block Polymer 24 | 100.0 | — | — |
| Binder Resin Solution 33 | Block Polymer 25 | 100.0 | — | — |
| Binder Resin Solution 34 | Block Polymer 26 | 100.0 | — | — |
| Binder Resin Solution 35 | Block Polymer 27 | 100.0 | — | — |
| Binder Resin Solution 36 | Block Polymer 28 | 100.0 | — | — |
| Binder Resin Solution 37 | Block Polymer 29 | 100.0 | — | — |
| Binder Resin Solution 38 | Block Polymer 30 | 100.0 | — | — |
| Binder Resin Solution 39 | Block Polymer 31 | 100.0 | — | — |
| Binder Resin Solution 40 | Block Polymer 18 | 60.0 | Crystalline Polyester Resin 6 | 40.0 |
| Binder Resin Solution 41 | Block Polymer 22 | 70.0 | Amorphous Polyester Resin 2 | 30.0 |
| Binder Resin Solution 42 | Block Polymer 18 | 80.0 | Styrene-Acrylic Resin 1 | 20.0 |

<Preparation of Block Polymer Dispersion 1>

| | |
| --- | --- |
| Block Polymer 32 | 115.0 parts by mass |
| Anionic surfactant Neogen RK (Dai-Ichi Kogyo Seiyaku) | 5.0 parts by mass |
| Deionized water | 180.0 parts by mass |

The above ingredients were mixed and heated to 100° C., thoroughly dispersed with an Ultra-Turrax T50 (manufactured by IKA), then subjected to 1 hour of dispersion treatment in a pressure discharge-type Gaulin homogenizer, giving Block Polymer Dispersion 1 having a volume-average particle diameter of 180 nm and a solids content of 38.3 mass %.

<Preparation of Amorphous Polyester Dispersion 1>

| | |
| --- | --- |
| Amorphous Polyester Resin 2 | 115.0 parts by mass |
| Anionic surfactant Neogen RK (Dai-Ichi Kogyo Seiyaku) | 5.0 parts by mass |
| Deionized water | 180.0 parts by mass |

The above ingredients were mixed and heated to 100° C., thoroughly dispersed with an Ultra-Turrax T50 (manufactured by IKA), then subjected to 1 hour of dispersion treatment in a pressure discharge-type Gaulin homogenizer, giving Amorphous Polyester Dispersion 1 having a volume-average particle diameter of 180 nm and a solids content of 38.3 mass %.

<Synthesis of Vinyl-Modified Polyester Monomer>

A reaction vessel fitted with a stirring rod and a thermometer was charged with

| | |
|---|---|
| Xylylene diisocyanate (XDI) after which | 59.0 parts by mass, |
| 2-Hydroxyethyl methacrylate | 41.0 parts by mass | was added dropwise and the reaction was effected at 55° C. for 4 hours, giving a vinyl-modified monomer intermediate.

A reaction vessel fitted with a stirring rod and a thermometer was then charged with

| | |
|---|---|
| Crystalline Polyester 9 | 83.0 parts by mass |
| THF | 100 parts by mass, | and dissolution was carried out at 50° C. Next, 10.0 parts by mass of the vinyl-modified monomer intermediate was added dropwise and reacted at 50° C. for 4 hours, giving a vinyl-modified polyester monomer solution. The THF serving as the solvent was driven off by distillation, giving a vinyl-modified polyester monomer.

<Preparation of Resin Fine Particle Dispersion 1>

| | |
|---|---|
| Vinyl-modified organic polysiloxane (X-22-2475: degree of polymerization n = 3, from Shin-Etsu Chemical) | 15.0 parts by mass |
| Vinyl-modified polyester monomer | 40.0 parts by mass |
| Styrene (St) | 35.0 parts by mass |
| Methacrylic acid (MAA) | 10.0 parts by mass |
| Azobis(methoxydimethylvaleronitrile) | 0.3 part by mass |
| THF | 50 parts by mass |

The above materials were charged into a beaker and stirred and mixed at 20° C. to prepare a monomer solution, which was then introduced into a dropping funnel that had been heat-dried beforehand. In a separate procedure, 100 parts by mass of THF was charged into a heat-dried two-neck flask. After flushing the flask with nitrogen, the dropping funnel was mounted onto the flask and the monomer solution was added dropwise under closed conditions at 70° C. over a period of 1 hour. Following the completion of dropwise addition, stirring was continued for 3 hours, then a mixture of 0.3 part by mass of azobis(methoxydimethylvaleronitrile) and 20.0 parts by mass of THF was added dropwise and stirring was carried out at 70° C. for 3 hours, thereby giving a reaction mixture.

This reaction mixture was then stirred at 5,000 rpm in a TK Homomixer (Tokushu Kikai Kogyo) and added dropwise over 10 minutes to 400.0 parts by mass of acetone that had been adjusted to 20° C., thereby giving a resin fine particle dispersion. Acetone was added so as to bring the solids concentration to 20.0 mass %, thereby giving Resin Fine Particle Dispersion 1. This Resin Fine Particle Dispersion 1 was dried and the number-average particle diameter of the primary particles was measured using a scanning electron microscope. The number-average particle diameter of the primary particles was 110 nm.

<Preparation of Colorant Dispersion 1>

| | |
|---|---|
| C.I. Pigment Blue 15:3 | 100.0 parts by mass |
| Acetone | 150.0 parts by mass |
| Glass beads (1 mm) | 300.0 parts by mass |

The above materials were charged into a heat-resistant glass vessel and dispersion was carried out for 5 hours with a paint shaker (Toyo Seiki). The glass beads were then removed with a nylon mesh, giving Colorant Dispersion 1 having a volume-average particle diameter of 200 nm and a solids content of 40.0 mass %.

<Preparation of Colorant Dispersion 2>

| | |
|---|---|
| C.I. Pigment Blue 15:3 | 45.0 parts by mass |
| Anionic surfactant Neogen RK (Dai-Ichi Kogyo Seiyaku) | 5.0 parts by mass |
| Deionized water | 200.0 parts by mass |
| Glass beads (1 mm) | 250.0 parts by mass |

The above materials were charged into a heat-resistant glass vessel and dispersion was carried out for 5 hours with a paint shaker (Toyo Seiki). The glass beads were then removed with a nylon mesh, giving Colorant Dispersion 2 having a volume-average particle diameter of 200 nm and a solids content of 20.0 mass %.

<Preparation of Wax Dispersion 1>

| | |
|---|---|
| Dipentaerythritol behenate wax | 16.0 parts by mass |
| Wax dispersing agent (copolymer with peak molecular weight of 8,500 obtained by graft copolymerizing 50.0 parts by mass of styrene, 25.0 parts by mass of n-butyl acrylate and 10.0 parts by mass of acrylonitrile in the presence of 15.0 parts by mass of polyethylene) | 8.0 parts by mass |
| Acetone | 76.0 parts by mass |

The above ingredients were charged into a glass beaker (Iwaki Glass) equipped with stirring blades, and the dipentaerythritol behenate wax was dissolved in the acetone by heating the interior of the system to 70° C.

Next, the system interior was gradually cooled under gentle stirring at 50 rpm, bringing the temperature down to 25° C. over a period of 3 hours to give a milky white liquid.

This liquid was charged, together with 20.0 parts by mass of 1 mm glass beads, into a heat-resistant vessel, and dispersion was carried out for 3 hours with a paint shaker, thereby giving Wax Dispersion 1 having a volume-average particle diameter of 270 nm and a solids content of 16.0 mass %.

<Preparation of Wax Dispersion 2>

| | |
|---|---|
| Dipentaerythritol behenate wax | 30.0 parts by mass |
| Wax dispersing agent (copolymer with peak molecular weight of 8,500 obtained by graft copolymerizing 50.0 parts by mass of styrene, 25.0 parts by mass of n-butyl acrylate and 10.0 parts by mass of acrylonitrile in the presence of 15.0 parts by mass of polyethylene) | 15.0 Parts by mass |
| Anionic surfactant Neogen RK (Dai-Ichi Kogyo Seiyaku) | 5.0 parts by mass |
| Deionized water | 200.0 parts by mass |

The above ingredients were mixed and heated to 95° C., thoroughly dispersed with a stirrer (Ultra-Turrax T50, from IKA), then subjected to dispersion treatment in a pressure discharge-type Gaulin homogenizer, thereby giving Wax Dispersion 2 having a volume-average particle diameter of 200 nm and a solids content of 20.0 mass %.

<Production of Toner 1>

(Toner Particle 1 (Before Treatment) Production Step)

Figure 3:
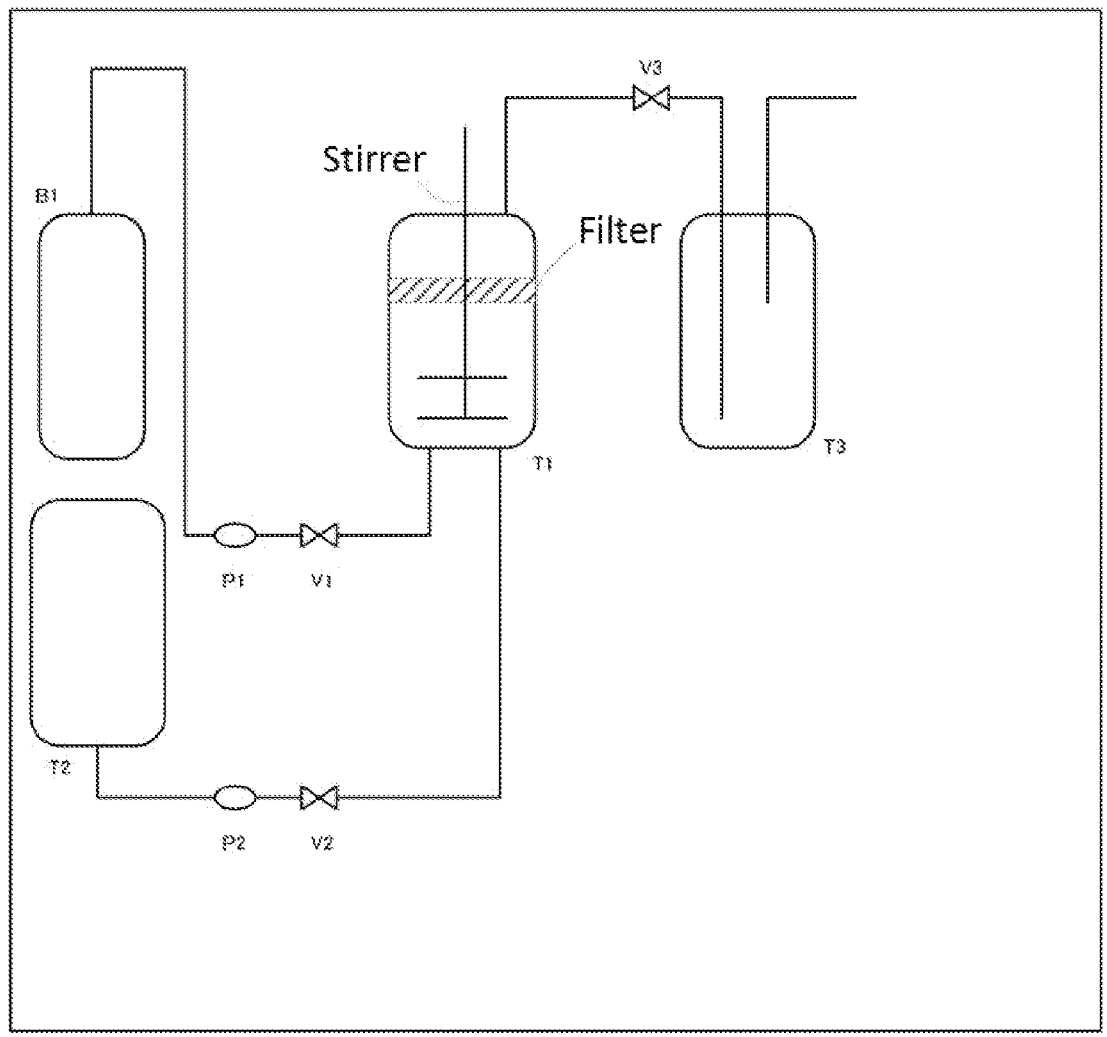
FIG. 3 is a diagram showing an example of an apparatus for producing toner.

In the apparatus shown in FIG. 3, first valves V1 and V2 and pressure regulating valve V3 were closed, 35.0 parts by mass of Resin Fine Particle Dispersion 1 was charged into a pressure-resistant granulation tank T1 equipped with a filter for collecting toner particles and a stirring mechanism, and the internal temperature was adjusted to 25° C. Next, valve V1 was opened and, using pump P1, carbon dioxide (purity, 99.99%) was introduced from carbon dioxide cylinder B1 into the granulation tank T1. When the internal pressure reached 3.0 MPa, the valve V1 was closed.

In a separate procedure, the following ingredients were charged into a resin solution tank T2, and the internal temperature was adjusted to 25° C.

| | |
|---|---|
| Binder Resin Solution 1 | 180.0 parts by mass |
| Wax Dispersion 1 | 31.3 parts by mass |
| Colorant Dispersion 1 | 12.5 parts by mass |
| Acetone | 31.2 parts by mass |

Next, valve V2 was opened and, while stirring the interior of the granulation tank T1 at 1,000 rpm, the contents of the resin solution tank T2 were introduced into the granulation tank T1 using the pump P2. When all the contents of tank T2 had been introduced into tank T1, valve V2 was closed. The internal pressure in the granulation tank T1 following such introduction became 5.0 MPa. The mass of all the carbon dioxide introduced was measured using a mass flowmeter, and found to be 280.0 parts by mass.

Following completion of the introduction of the resin solution tank T2 contents into the granulation tank T1, granulation was carried out by 10 minutes of stirring at a temperature of 25° C. and 2,000 rpm.

Next, valve V1 was opened and carbon dioxide was introduced from carbon dioxide cylinder B1 into the granulation tank T1 using pump P1. At this time, the pressure regulating valve V3 was set to 10.0 MPa and, while holding the internal pressure of the granulation tank T1 at 10.0 MPa, carbon dioxide was additionally passed through. By means of this operation, carbon dioxide containing organic solvent (primarily acetone) that had been extracted from the liquid drops following granulation was discharged into a solvent recovery tank T3, and the organic solvent and carbon dioxide were separated.

Carbon dioxide introduction into the granulation tank T1 was stopped when the quantity introduced reached 15 times the mass of carbon dioxide initially introduced into the granulation tank T1. At this point, the operation of replacing the organic solvent-containing carbon dioxide with carbon dioxide containing no organic solvent was completed.

In addition, by opening pressure regulating valve V3 a little at a time and reducing the internal pressure of the granulation tank T1 to atmospheric pressure, the Toner Particle 1 (before treatment) that had been collected by the filter was recovered.

The resulting Toner Particle 1 (before treatment) was subjected to DSC measurement, and the peak temperature (Tm) of the maximum endothermic peak derived from the binder resin was determined to be 60° C.

(Annealing Treatment Step)

Annealing treatment was carried out using a thermostatic dryer (41-S5, manufactured by Satake Chemical Equipment Mfg.). The internal temperature of the thermostatic dryer was adjusted to 50° C.

The above Toner Particle 1 (before treatment) was spread out uniformly within a stainless steel vat, then was placed in this state within the thermostatic dryer and left at rest for 5 hours, after which it was taken out, thereby giving annealed Toner Particle 1 (after treatment).

The resulting Toner Particle 1 (after treatment) was subjected to DSC measurement, and the peak temperature (melting point Tm) of the maximum endothermic peak derived from the binder resin was determined to be 63° C.

TABLE 4

| | Binder resin solution | | Colorant dispersion | | Wax dispersion | | Solvent | | Resin fine particle dispersion | | Tm (° C.) of toner particle (before treatment) | Annealing conditions | | External additive | |
|---|---|---|---|---|---|---|---|---|---|---|---|---|---|---|---|
| | | | | | | | | | | | | Temperature (° C.) | Time (h) | Silica 1 (parts by mass) | Titanium 1 (parts by mass) |
| | No. | Amount added | No. | Amount added | No. | Amount added | Type | Amount added | No. | Amount added | | | | | |
| Toner 1 | 1 | 180.0 | 1 | 12.5 | 1 | 31.3 | Acetone | 31.2 | 1 | 35.0 | 60 | 50 | 5 | 1.8 | 0.15 |
| Toner 2 | 2 | 180.0 | 1 | 12.5 | 1 | 31.3 | Acetone | 31.2 | 1 | 35.0 | 60 | 50 | 5 | 1.8 | 0.15 |
| Toner 3 | 3 | 180.0 | 1 | 12.5 | 1 | 31.3 | Acetone | 31.2 | 1 | 35.0 | 60 | 50 | 5 | 1.8 | 0.15 |
| Toner 4 | 4 | 180.0 | 1 | 12.5 | 1 | 31.3 | Acetone | 31.2 | 1 | 35.0 | 60 | 50 | 5 | 1.8 | 0.15 |
| Toner 5 | 5 | 180.0 | 1 | 12.5 | 1 | 31.3 | Acetone | 31.2 | 1 | 35.0 | 60 | 50 | 5 | 1.8 | 0.15 |
| Toner 6 | 6 | 180.0 | 1 | 12.5 | 1 | 31.3 | Acetone | 31.2 | 1 | 35.0 | 60 | 50 | 5 | 1.8 | 0.15 |
| Toner 7 | 7 | 180.0 | 1 | 12.5 | 1 | 31.3 | Acetone | 31.2 | 1 | 35.0 | 60 | 50 | 5 | 1.8 | 0.15 |
| Toner 8 | 8 | 180.0 | 1 | 12.5 | 1 | 31.3 | Acetone | 31.2 | 1 | 35.0 | 60 | 50 | 5 | 1.8 | 0.15 |
| Toner 9 | 9 | 180.0 | 1 | 12.5 | 1 | 31.3 | Acetone | 31.2 | 1 | 35.0 | 60 | 50 | 5 | 1.8 | 0.15 |
| Toner 10 | 10 | 180.0 | 1 | 12.5 | 1 | 31.3 | Acetone | 31.2 | 1 | 35.0 | 60 | 50 | 5 | 1.8 | 0.15 |
| Toner 11 | 11 | 180.0 | 1 | 12.5 | 1 | 31.3 | Acetone | 31.2 | 1 | 35.0 | 60 | 50 | 5 | 1.8 | 0.15 |
| Toner 12 | 12 | 180.0 | 1 | 12.5 | 1 | 31.3 | Acetone | 31.2 | 1 | 35.0 | 60 | 50 | 5 | 1.8 | 0.15 |
| Toner 13 | 13 | 180.0 | 1 | 12.5 | 1 | 31.3 | Acetone | 31.2 | 1 | 35.0 | 60 | 50 | 5 | 1.8 | 0.15 |
| Toner 14 | 14 | 180.0 | 1 | 12.5 | 1 | 31.3 | Acetone | 31.2 | 1 | 35.0 | 67 | 57 | 5 | 1.8 | 0.15 |
| Toner 15 | 15 | 180.0 | 1 | 12.5 | 1 | 31.3 | Acetone | 31.2 | 1 | 35.0 | 53 | 43 | 5 | 1.8 | 0.15 |
| Toner 16 | 16 | 180.0 | 1 | 12.5 | 1 | 31.3 | Acetone | 31.2 | 1 | 35.0 | 60 | 50 | 5 | 1.8 | 0.15 |
| Toner 17 | 17 | 180.0 | 1 | 12.5 | 1 | 31.3 | Acetone | 31.2 | 1 | 35.0 | 60 | 50 | 5 | 1.8 | 0.15 |
| Toner 18 | 18 | 180.0 | 1 | 12.5 | 1 | 31.3 | Acetone | 31.2 | 1 | 35.0 | 60 | 50 | 5 | 1.8 | 0.15 |
| Toner 19 | 19 | 180.0 | 1 | 12.5 | 1 | 31.3 | Acetone | 31.2 | 1 | 35.0 | 60 | 50 | 5 | 1.8 | 0.15 |
| Toner 20 | 20 | 180.0 | 1 | 12.5 | 1 | 31.3 | Acetone | 31.2 | 1 | 35.0 | 60 | 50 | 5 | 1.8 | 0.15 |
| Toner 21 | 21 | 180.0 | 1 | 12.5 | 1 | 31.3 | Acetone | 31.2 | 1 | 35.0 | 60 | 50 | 5 | 1.8 | 0.15 |
| Toner 22 | 22 | 180.0 | 1 | 12.5 | 1 | 31.3 | Acetone | 31.2 | 1 | 35.0 | 60 | 50 | 5 | 1.8 | 0.15 |
| Toner 23 | 23 | 180.0 | 1 | 12.5 | 1 | 31.3 | Acetone | 31.2 | 1 | 35.0 | 60 | 50 | 5 | 1.8 | 0.15 |
| Toner 24 | 24 | 180.0 | 1 | 12.5 | 1 | 31.3 | Acetone | 31.2 | 1 | 35.0 | 60 | 50 | 5 | 1.8 | 0.15 |
| Toner 25 | 25 | 180.0 | 1 | 12.5 | 1 | 31.3 | Acetone | 31.2 | 1 | 35.0 | 60 | 50 | 5 | 1.8 | 0.15 |
| Toner 26 | 26 | 180.0 | 1 | 12.5 | 1 | 31.3 | Acetone | 31.2 | 1 | 35.0 | 60 | 50 | 5 | 1.8 | 0.15 |

TABLE 4-continued

| | Binder resin solution | | Colorant dispersion | | Wax dispersion | | Solvent | | Resin fine particle dispersion | | Tm (°C.) of toner particle (before treatment) | Annealing conditions | | External additive | |
|---|---|---|---|---|---|---|---|---|---|---|---|---|---|---|---|
| | | | | | | | | | | | | Temperature (°C.) | Time (h) | Silica 1 (parts by mass) | Titanium 1 (parts by mass) |
| | No. | Amount added | No. | Amount added | No. | Amount added | Type | Amount added | No. | Amount added | | | | | |
| Toner 27 | 27 | 180.0 | 1 | 12.5 | 1 | 31.3 | Acetone | 31.2 | 1 | 35.0 | 60 | 50 | 5 | 1.8 | 0.15 |
| Toner 28 | 28 | 180.0 | 1 | 12.5 | 1 | 31.3 | Acetone | 31.2 | 1 | 35.0 | 60 | 50 | 5 | 1.8 | 0.15 |
| Toner 29 | 29 | 180.0 | 1 | 12.5 | 1 | 31.3 | Acetone | 31.2 | 1 | 35.0 | 60 | 50 | 5 | 1.8 | 0.15 |
| Toner 30 | 30 | 180.0 | 1 | 12.5 | 1 | 31.3 | Acetone | 31.2 | 1 | 35.0 | 60 | 50 | 5 | 1.8 | 0.15 |
| Toner 31 | 31 | 180.0 | 1 | 12.5 | 1 | 31.3 | Acetone | 31.2 | 1 | 35.0 | 60 | 50 | 5 | 1.8 | 0.15 |
| Toner 32 | 32 | 180.0 | 1 | 12.5 | 1 | 31.3 | Acetone | 31.2 | 1 | 35.0 | 60 | 50 | 5 | 1.8 | 0.15 |
| Toner 33 | 33 | 180.0 | 1 | 12.5 | 1 | 31.3 | Acetone | 31.2 | 1 | 35.0 | 53 | 43 | 5 | 1.8 | 0.15 |
| Toner 34 | 34 | 180.0 | 1 | 12.5 | 1 | 31.3 | Acetone | 31.2 | 1 | 35.0 | 58 | 48 | 5 | 1.8 | 0.15 |
| Toner 35 | 35 | 180.0 | 1 | 12.5 | 1 | 31.3 | Acetone | 31.2 | 1 | 35.0 | 67 | 57 | 5 | 1.8 | 0.15 |
| Toner 36 | 36 | 180.0 | 1 | 12.5 | 1 | 31.3 | Acetone | 31.2 | 1 | 35.0 | 60 | 50 | 5 | 1.8 | 0.15 |
| Toner 37 | 37 | 180.0 | 1 | 12.5 | 1 | 31.3 | Acetone | 31.2 | 1 | 35.0 | 60 | 50 | 5 | 1.8 | 0.15 |
| Toner 38 | 38 | 180.0 | 1 | 12.5 | 1 | 31.3 | Acetone | 31.2 | 1 | 35.0 | 60 | 50 | 5 | 1.8 | 0.15 |
| Toner 39 | 39 | 180.0 | 1 | 12.5 | 1 | 31.3 | Acetone | 31.2 | 1 | 35.0 | 60 | 50 | 5 | 1.8 | 0.15 |
| Toner 40 | 40 | 180.0 | 1 | 12.5 | 1 | 31.3 | Acetone | 31.2 | 1 | 35.0 | 60 | 50 | 5 | 1.8 | 0.15 |
| Toner 41 | 41 | 180.0 | 1 | 12.5 | 1 | 31.3 | Acetone | 31.2 | 1 | 35.0 | 60 | 50 | 5 | 1.8 | 0.15 |
| Toner 42 | 42 | 180.0 | 1 | 12.5 | 1 | 31.3 | Acetone | 31.2 | 1 | 35.0 | — | — | — | 1.8 | 0.15 |

Silica 1: Hydrophobic silica fine particles (number-average diameter of primary particles, 7 nm)
Titanium 1: Rutile-type titanium oxide fine powder (number-average diameter of primary particles, 30 nm)
(Toner 1 Production Step)

Toner 1 according to the invention was obtained by dry mixing, for 5 minutes in a Henschel mixer (Mitsui Mining Co., Ltd.): 1.8 parts by mass of hexamethyldisilazane-treated hydrophobic silica fine powder (number-average diameter of primary particles, 7 nm) and 0.15 part by mass of rutile-type titanium oxide fine powder (number-average diameter of primary particles, 30 nm) with 100.0 parts by mass of above Toner Particle 1 (after treatment).

This Toner 1 was subjected to a three-point bending test by the method described above. The maximum value $E_{MAX}$ of the flexural elasticity modulus E determined from the resulting load-deflection curve and the strain energy u per unit volume are shown in Table 5.

The particle sizes of Toner 1 were as follows: the weight-average particle diameter D4 was 5.7 μm, and the number-average particle diameter D1 was 4.8 μm. The content of the crystalline polyester resin component in the binder resin, as calculated from the total amount of additives, was 75.0 mass %.

TABLE 5

| | Three-point bending test on toner | | Melting point Tm (°C.) of toner particles (after treatment) | Toner particle diameter D4 (μm) | Toner particle diameter D1 (μm) | Content of crystalline polyester resin component in binder resin (mass %) | Concentration of ester bonds from crystalline polyester resin component in binder resin (mmol/g) | Block polymer content in binder resin (mass %) | Content of added crystalline polyester in binder resin (mass %) | Concentration of ester bonds in added crystalline polyester (mmol/g) |
|---|---|---|---|---|---|---|---|---|---|---|
| | Maximum value $E_{MAX}$ of flexural elasticity modulus E (MPa) | Strain energy u (MPa) | | | | | | | | |
| Toner 1 | 364 | 0.94 | 63 | 5.7 | 4.8 | 75.0 | 4.6 | 100.0 | — | 0.0 |
| Toner 2 | 385 | 1.01 | 63 | 5.8 | 4.8 | 72.5 | 4.5 | 100.0 | — | 0.0 |
| Toner 3 | 361 | 0.93 | 63 | 5.7 | 4.8 | 77.5 | 4.8 | 100.0 | — | 0.0 |
| Toner 4 | 340 | 0.86 | 63 | 5.9 | 4.9 | 80.0 | 4.9 | 100.0 | — | 0.0 |
| Toner 5 | 385 | 1.01 | 63 | 6.0 | 5.0 | 75.0 | 4.6 | 100.0 | — | 0.0 |
| Toner 6 | 352 | 0.89 | 63 | 6.1 | 5.1 | 80.0 | 4.9 | 100.0 | — | 0.0 |
| Toner 7 | 376 | 0.98 | 63 | 6.2 | 5.2 | 77.5 | 4.8 | 100.0 | — | 0.0 |
| Toner 8 | 339 | 0.86 | 63 | 5.6 | 4.7 | 80.0 | 4.9 | 100.0 | — | 0.0 |
| Toner 9 | 364 | 0.94 | 63 | 5.8 | 4.8 | 77.5 | 4.8 | 100.0 | — | 0.0 |
| Toner 10 | 389 | 1.02 | 63 | 5.7 | 4.8 | 75.0 | 4.6 | 100.0 | — | 0.0 |
| Toner 11 | 379 | 0.99 | 63 | 5.8 | 4.8 | 80.0 | 4.9 | 100.0 | — | 0.0 |
| Toner 12 | 343 | 0.87 | 63 | 5.7 | 4.8 | 80.0 | 4.9 | 100.0 | — | 0.0 |
| Toner 13 | 388 | 1.02 | 63 | 5.8 | 4.8 | 75.0 | 4.6 | 100.0 | — | 0.0 |
| Toner 14 | 339 | 0.85 | 70 | 5.7 | 4.8 | 82.5 | 4.5 | 100.0 | — | 0.0 |
| Toner 15 | 393 | 1.04 | 56 | 5.9 | 4.9 | 72.5 | 5.0 | 100.0 | — | 0.0 |
| Toner 16 | 436 | 1.19 | 63 | 5.7 | 4.8 | 70.0 | 4.3 | 100.0 | — | 0.0 |
| Toner 17 | 443 | 1.21 | 63 | 5.8 | 4.8 | 70.0 | 4.3 | 100.0 | — | 0.0 |
| Toner 18 | 356 | 0.90 | 63 | 6.1 | 5.1 | 76.0 | 4.7 | 80.0 | 20.0 | 6.2 |
| Toner 19 | 396 | 1.01 | 63 | 6.2 | 5.2 | 74.8 | 4.6 | 84.0 | 16.0 | 6.2 |
| Toner 20 | 226 | 0.44 | 63 | 6.0 | 5.0 | 79.9 | 4.9 | 67.0 | 33.0 | 6.2 |
| Toner 21 | 383 | 0.96 | 63 | 6.1 | 5.1 | 79.1 | 4.9 | 95.0 | 5.0 | 6.2 |
| Toner 22 | 376 | 0.94 | 63 | 6.2 | 5.2 | 77.5 | 4.8 | 90.0 | 10.0 | 6.2 |

TABLE 5-continued

|  | Three-point bending test on toner | | Melting point Tm (° C.) of toner particles (after treatment) | Toner particle diameter D4 (μm) | Toner particle diameter D1 (μm) | Content of crystalline polyester resin component in binder resin (mass %) | Concentration of ester bonds from crystalline polyester resin component in binder resin (mmol/g) | Block polymer content in binder resin (mass %) | Content of added crystalline polyester in binder resin (mass %) | Concentration of ester bonds in added crystalline polyester (mmol/g) |
|---|---|---|---|---|---|---|---|---|---|---|
|  | Maximum value $E_{MAX}$ of flexural elasticity modulus E (MPa) | Strain energy u (MPa) | | | | | | | | |
| Toner 23 | 243 | 0.49 | 63 | 5.6 | 4.7 | 79.0 | 4.9 | 60.0 | 40.0 | 6.2 |
| Toner 24 | 276 | 0.60 | 63 | 5.8 | 4.8 | 79.2 | 4.9 | 52.0 | 48.0 | 6.2 |
| Toner 25 | 287 | 0.64 | 63 | 6.1 | 5.1 | 64.0 | 3.9 | 80.0 | 20.0 | 0.0 |
| Toner 26 | 377 | 0.95 | 63 | 6.2 | 5.2 | 76.0 | 4.7 | 95.0 | 5.0 | 0.0 |
| Toner 27 | 203 | 0.36 | 63 | 5.6 | 4.7 | 52.8 | 3.2 | 66.0 | 34.0 | 0.0 |
| Toner 28 | 356 | 0.84 | 63 | 5.8 | 4.8 | 76.0 | 4.9 | 80.0 | 20.0 | 7.1 |
| Toner 29 | 356 | 0.84 | 63 | 5.7 | 4.8 | 76.0 | 4.5 | 80.0 | 20.0 | 5.3 |
| Toner 30 | 207 | 0.38 | 63 | 5.8 | 4.8 | 84.0 | 5.2 | 80.0 | 20.0 | 6.2 |
| Toner 31 | 546 | 1.58 | 63 | 5.7 | 4.8 | 70.0 | 4.3 | 100.0 | — | 0.0 |
| Toner 32 | 284 | 0.66 | 63 | 5.8 | 4.8 | 90.0 | 5.5 | 100.0 | — | 0.0 |
| Toner 33 | 528 | 1.55 | 56 | 6.1 | 5.1 | 60.0 | 4.1 | 100.0 | — | 0.0 |
| Toner 34 | 378 | 0.99 | 61 | 6.2 | 5.2 | 80.0 | 5.4 | 100.0 | — | 0.0 |
| Toner 35 | 298 | 0.71 | 70 | 5.6 | 4.7 | 90.0 | 4.9 | 100.0 | — | 0.0 |
| Toner 36 | 496 | 1.40 | 63 | 5.8 | 4.8 | 65.0 | 4.0 | 100.0 | — | 0.0 |
| Toner 37 | 263 | 0.60 | 63 | 5.6 | 4.7 | 90.0 | 5.5 | 100.0 | — | 0.0 |
| Toner 38 | 506 | 1.43 | 63 | 5.8 | 4.8 | 65.0 | 4.0 | 100.0 | — | 0.0 |
| Toner 39 | 259 | 0.58 | 63 | 5.6 | 4.7 | 90.0 | 5.5 | 100.0 | — | 0.0 |
| Toner 40 | 156 | 0.22 | 63 | 5.8 | 4.8 | 82.0 | 5.1 | 60.0 | 40.0 | 6.2 |
| Toner 41 | 576 | 1.63 | 63 | 5.6 | 4.7 | 42.0 | 2.6 | 70.0 | 30.0 | 0.0 |
| Toner 42 | 556 | 0.57 | 63 | 5.8 | 4.8 | 56.0 | 3.4 | 80.0 | 20.0 | 0.0 |
| Toner 43 | 510 | 0.08 | 69 | 6.1 | 5.1 | 32.0 | 0.7 | 80.0 | — | 0.0 |
| Toner 44 | 610 | 0.16 | 63 | 7.5 | 6.3 | 25.0 | 2.5 | 50.0 | — | 0.0 |
| Toner 45 | 480 | 0.05 | 68 | 7.4 | 6.2 | 20.0 | 1.2 | 0.0 | 20.0 | 6.2 |

<Production of Toners 2 to 42>

Aside from changing Binder Resin Solution 1 in the Toner Particle 1 (before treatment) production step to the binder resin solution shown in Table 4, Toners 2 to 42 were obtained by carrying out production in the same way as for Toner 1.

The maximum value $E_{MAX}$ of the flexural elasticity modulus E, the strain energy u per unit volume, the particle diameter, the melting point, the content of crystalline polyester resin in the binder resin, and the concentration of ester bonds from crystalline polyester resin in the binder resin for each of Toners 2 to 42 are shown in Table 5.

The content of crystalline polyester resin component in the binder resin was calculated from the crystalline polyester resin component in the block polymer and amount of crystalline polyester resin added.

The concentration of ester bonds derived from the crystalline polyester resin component per gram of binder resin was arrived at by totaling up the ester bond concentration and content in the block polymer and the ester bond concentration and content in the added crystalline polyester resin, and the result was treated as the concentration of ester bonds derived from the crystalline polyester resin in the binder resin.

<Production of Toner 43>

(Toner Particle 43 (Before Treatment) Production Step)

| Block Polymer Dispersion 1 | 91.3 parts by mass |
|---|---|
| Amorphous Polyester Dispersion 1 | 137.0 parts by mass |
| Colorant Dispersion 2 | 27.8 parts by mass |
| Wax Dispersion 2 | 41.7 parts by mass |
| Polyaluminum chloride | 0.41 part by mass |

The above ingredients were placed in a round stainless steel flask and thoroughly mixed and dispersed with a stirrer (Ultra-Turrax T50, from IKA). The flask was heated to 47° C. under stirring on an oil bath and this temperature was held for 60 minutes, following which 13.0 parts by mass of Amorphous Resin Dispersion 1 was gradually added. Next, the pH within the system was set to 5.4 with an 0.5 mol/L aqueous solution of sodium hydroxide, following which the stainless steel flask was closed and, using a magnetic seal, was heated to 96° C. under continued stirring and held at that temperature for 5 hours.

Following reaction completion, cooling, filtration and thorough washing with deionized water were carried out, after which the product was subjected to solid-liquid separation with a Buchner-type suction filter. The product was then re-dispersed in 3 L of 40° C. deionized water and stirred and washed for 15 minutes at 300 rpm. Vacuum drying was then carried out continuously for 12 hours, giving Toner Particle 43 (before treatment). The peak temperature (Tm) of the maximum endothermic peak for the resulting Toner Particle 43 (before treatment) in DSC measurement was 66° C.

(Annealing Treatment Step)

Annealing treatment was carried out using a thermostatic dryer (41-S5, manufactured by Satake Chemical Equipment Mfg.). The internal temperature of the thermostatic dryer was adjusted to 56° C.

The above Toner Particle 43 (before treatment) was spread out uniformly within a stainless steel vat, then was placed in this state within the thermostatic dryer and left at rest for 5 hours, after which it was taken out, thereby giving annealed Toner Particle 43 (after treatment).

The resulting Toner Particle 43 (after treatment) was subjected to DSC measurement, and the peak temperature (Tm) of the maximum endothermic peak from the binder resin was determined to be 69° C.

(Toner 43 Production Step)

Toner 43 according to the invention was obtained by dry mixing, for 5 minutes in a Henschel mixer (Mitsui Mining Co., Ltd.): 1.8 parts by mass of hexamethyldisilazane-treated hydrophobic silica fine powder (number-average diameter of primary particles, 7 nm) and 0.15 part by mass of rutile-type titanium oxide fine powder (number-average diameter of primary particles, 30 nm) with 100.0 parts by mass of above Toner Particle 43 (after treatment).

This Toner 43 was subjected to a three-point bending test by the method described above. The maximum value $E_{MAX}$ of the flexural elasticity modulus E determined from the resulting load-deflection curve and the strain energy u per unit volume are shown in Table 5.

The particle sizes of Toner 43 were as follows: the weight-average particle diameter D4 was 6.1 μm, and the number-average particle diameter D1 was 5.1 μm. The content of the crystalline polyester resin component in the binder resin, as calculated from the total amount of additives, was 32.0 mass %.

In Toner 43, the concentration of ester bonds derived from the crystalline polyester resin component was 0.7 mmol/g.

<Production of Toner 44>

Toner 44 was produced by the following method.

| | |
|---|---|
| Block Polymer 33 | 50.0 parts by mass |
| Styrene-Acrylic Resin 1 | 50.0 parts by mass |
| Pigment Blue 15:3 | 5.0 parts by mass |
| Dipentaerythritol behenate wax | 5.0 parts by mass |
| Wax dispersing agent (copolymer with peak molecular weight of 8,500, obtained by graft copolymerizing 50.0 parts by mass of styrene, 25.0 parts by mass of n-butyl acrylate and 10.0 parts by mass of acrylonitrile in the presence of 15.0 parts by mass of polyethylene) | 2.5 parts by mass |

The materials formulated as indicated above were thoroughly mixed in a Henschel mixer (FM-75, from Mitsui Miike Chemical Engineering Machinery), then kneaded in a twin-screw kneader (PCM-45, from Ikegai Tekko KK) set to a temperature of 140° C. The kneaded material was cooled, then coarsely pulverized to a size of 1 mm or less with a hammer mill, giving a coarsely pulverized material. The resulting coarsely pulverized toner was ground with an impact-type jet mill using high-pressure gas. Next, the fine product and coarse product were precisely removed at the same time from the resulting finely ground material with a multi-grade classifier, giving Toner Particle 44 (before treatment). The resulting Toner Particle 44 (before treatment) was subjected to DSC measurement, and the peak temperature (Tm) of the maximum endothermic peak was 60° C.

(Annealing Treatment Step)

Annealing treatment was carried out using a thermostatic dryer (41-S5, manufactured by Satake Chemical Equipment Mfg.). The internal temperature of the thermostatic dryer was adjusted to 50° C.

The above Toner Particle 44 (before treatment) was spread out uniformly within a stainless steel vat, then was placed in this state within the thermostatic dryer and left at rest for 5 hours, after which it was taken out, thereby giving annealed Toner Particle 44 (after treatment).

The resulting Toner Particle 44 (after treatment) was subjected to DSC measurement, and the peak temperature (Tm) of the maximum endothermic peak from the binder resin was determined to be 63° C.

(Toner 44 Production Step)

Toner 44 according to the invention was obtained by dry mixing, for 5 minutes in a Henschel mixer (Mitsui Mining Co., Ltd.): 1.8 parts by mass of hexamethyldisilazane-treated hydrophobic silica fine powder (number-average diameter of primary particles, 7 nm) and 0.15 part by mass of rutile-type titanium oxide fine powder (number-average diameter of primary particles, 30 nm) with 100.0 parts by mass of above Toner Particle 44 (after treatment).

This Toner 44 was subjected to a three-point bending test by the method described above. The maximum value $E_{MAX}$ of the flexural elasticity modulus E determined from the resulting load-deflection curve and the strain energy u per unit volume are shown in Table 5.

The particle sizes of Toner 44 were as follows: the weight-average particle diameter D4 was 7.5 μm, and the number-average particle diameter D1 was 6.3 μm.

The content of the crystalline polyester resin component in the binder resin, as calculated from the total amount of additives, was 25.0 mass %.

In Toner 44, the concentration of ester bonds derived from the crystalline polyester resin component was 2.5 mmol/g.

(Production of Toner 45)

Toner 45 was produced by the following method.

| | |
|---|---|
| Amorphous Polyester 1 | 80.0 parts by mass |
| Crystalline Polyester 6 | 20.0 parts by mass |
| Pigment Blue 15:3 | 5.0 parts by mass |
| Dipentaerythritol behenate wax | 5.0 parts by mass |
| Wax dispersing agent (copolymer with peak molecular weight of 8,500 obtained by graft copolymerizing 50.0 parts by mass of styrene, 25.0 parts by mass of n-butyl acrylate and 10.0 parts by mass of acrylonitrile in the presence of 15.0 parts by mass of polyethylene) | 2.5 parts by mass |

The materials formulated as indicated above were thoroughly mixed in a Henschel mixer (FM-75, from Mitsui Miike Chemical Engineering Machinery), then kneaded in a twin-screw kneader (PCM-45, from Ikegai Tekko KK) set to a temperature of 140° C. The kneaded material was cooled, then coarsely pulverized to a size of 1 mm or less with a hammer mill, giving a coarsely pulverized material. The resulting coarsely pulverized toner was ground with an impact-type jet mill using high-pressure gas. Next, the fine product and coarse product were precisely removed at the same time from the resulting finely ground material with a multi-grade classifier, giving Toner Particle 45 (before treatment). The resulting Toner Particle 45 (before treatment) was subjected to DSC measurement, and the peak temperature (Tm) of the maximum endothermic peak was 65° C.

(Annealing Treatment Step)

Annealing treatment was carried out using a thermostatic dryer (41-S5, manufactured by Satake Chemical Equipment Mfg.). The internal temperature of the thermostatic dryer was adjusted to 55° C.

The above Toner Particle 45 (before treatment) was spread out uniformly within a stainless steel vat, then was placed in this state within the thermostatic dryer and left at rest for 5 hours, after which it was taken out, thereby giving annealed Toner Particle 45 (after treatment).

The resulting Toner Particle 45 (after treatment) was subjected to DSC measurement, and the peak temperature (Tm) of the maximum endothermic peak from the binder resin was determined to be 68° C.

(Toner 45 Production Step)

Toner 45 according to the invention was obtained by dry mixing, for 5 minutes in a Henschel mixer (Mitsui Mining Co., Ltd.): 1.8 parts by mass of hexamethyldisilazane-treated hydrophobic silica fine powder (number-average diameter of primary particles, 7 nm) and 0.15 part by mass of rutile-type titanium oxide fine powder (number-average diameter of primary particles, 30 nm) with 100.0 parts by mass of above Toner Particle 45 (after treatment).

This Toner 45 was subjected to a three-point bending test by the method described above. The maximum value $E_{MAX}$ of the flexural elasticity modulus E determined from the resulting load-deflection curve and the strain energy u per unit volume are shown in Table 5.

The particle sizes of Toner 45 were as follows: the weight-average particle diameter D4 was 7.4 μm, and the number-average particle diameter D1 was 6.2 μm. The content of the crystalline polyester resin component in the binder resin, as calculated from the total amount of additives, was 20.0 mass %.

In Toner 45, the concentration of ester bonds from the crystalline polyester resin component was 1.2 mmol/g.

WORKING EXAMPLES 1 TO 30 AND COMPARATIVE EXAMPLES 1 TO 15

The resulting Toners 1 to 45 were evaluated based on the methods described below. The results of the evaluations are shown in Table 6.
<Toner Evaluation Methods>
<Evaluation of Heat-Resistant Storage Stability>
Ten grams of the toner to be evaluated was placed in a 100 mL plastic cup and left to stand in a 53° C. environment for 3 days, following which the condition of the powder was visually evaluated.
(Evaluation Criteria)
A: The powder is substantially in the same condition as initially, with no observable agglomerates whatsoever.
B: Some tendency for clumping is apparent, but the clumps break up with about 5 light shakes of the plastic cup, posing no particular problem.
C: Some tendency for clumping is apparent, but because the clumps are easily broken up with the fingers, the powder is fit for actual use.
D: Considerable clumping has arisen.
E: Caking has occurred.
<Low-Temperature Fixability>
The low-temperature fixability was evaluated using a Canon LBP 5300 printer. The cartridge used for evaluation was prepared by removing the toner contained in a commercial cartridge, cleaning out the interior with an air blower and then packing the empty cartridge with the toner to be evaluated. This cartridge was left to stand for 24 hours in a normal temperature and humidity environment (23° C., 60% RH), after which it was loaded into the cyan station of the LBP 5300 and dummy cartridges were loaded into the other stations. Next, unfixed toner images were formed, in a single-color mode, as solid images with a top margin of 5 mm, a width of 100 mm, and a length of 28 mm (toner loading per unit surface area, 0.6 mg/cm$^2$) on rough paper (Xerox 4025; 75 g/m$^2$).

A fixing test was carried out using a fixing unit that was removed from the above-mentioned color laser printer and modified to enable adjustment of the fixing temperature. The evaluation method was as follows. Fixing of the above unfixed image was carried out in a normal temperature and humidity environment (23° C., 60% RH) after setting the process speed to 220 mm/s and the fixing temperature to 100° C. The resulting fixed image was rubbed back-and-forth ten times with lens-cleaning paper under a load of 14.7 kPa (150 g/cm$^2$) and the percent decrease in density ΔD (%) after rubbing relative to before rubbing, as expressed by the formula below, was calculated. This value was used as an indicator of the fixing performance. The evaluation results are shown in Table 6. The image density was determined using a reflection densitometer (500 Series Spectrodensitometer) from X-Rite. In this invention, ratings of from A to C were regarded as indicative of a good image fixing performance.

$\Delta D(\%) = \{$(image density before rubbing−image density after rubbing)/image density before rubbing$\} \times 100$ (Evaluation Criteria)
A: ΔD was less than 3.0%.
B: ΔD was at least 3.0% and below 5.0%.
C: ΔD was at least 5.0% and below 8.0%.
D: ΔD was at least 8.0% and below 10.0%.
E: ΔD was 10.0% or more.
<Evaluation of Hot Offset Resistance>
The evaluation of hot offset resistance was carried out by changing the paper used in the above evaluation of low-temperature fixability to ordinary A4 paper ("Office Planner" from Canon Inc.; 64 g/m$^2$) and forming similar solid images. The fixing temperature was evaluated by starting at 140° C. and going up to 180° C. in 5° C. increments. In the fixed image, the temperature at which hot offset was visually observed is treated as the hot offset starting temperature, and the highest temperature of the temperatures lower than the hot offset starting temperature was treated as the high-temperature fixing temperature. In cases where hot offset did not arise up to a fixing temperature of 180° C., this temperature of 180° C. was treated as the high-temperature fixing temperature. The evaluation results are shown in Table 6. In this invention, ratings of from A to C were regarded as indicative of a good fixing performance at high temperatures.
(Evaluation Criteria)
A: High-temperature fixing temperature was 180° C. or more.
B: High-temperature fixing temperature was at least 170° C. and below 180° C.
C: High-temperature fixing temperature was at least 160° C. and below 170° C.
D: High-temperature fixing temperature was at least 150° C. and below 160° C.
E: High-temperature fixing temperature was below 150° C.
<Method of Evaluating Fines Content>
The durability was evaluated using a commercial printer (Canon LBP 9200C). The LBP 9200C makes use of monocomponent contact development and regulates the amount of toner on the image-bearing member with a toner regulating member. The cartridge used for evaluation was prepared by removing the toner contained in a commercial cartridge, cleaning out the interior with an air blower and then packing the empty cartridge with 260 g of the toner to be evaluated. This cartridge was loaded into the cyan station, dummy cartridges were loaded into the other stations, and evaluation was carried out.

In a high-temperature, high-humidity environment (30° C., 80% RH), images having a coverage ratio of 1% were continuously output in a print run of 50,000 pages while replenishing the toner every 10,000 pages.

Measurement of the toner fines content was carried out with an FPIA-3100 (Sysmex Corporation) flow particle image analyzer under the measurement and analysis conditions at the time of calibration work.

The measurement method was as follows. A suitable amount of a surfactant, and preferably sodium dodecylbenzenesulfonate, was added as the dispersing agent to 20 mL of deionized water. Next, 0.02 g of the measurement sample was added and, using a desktop ultrasonic cleaner/disperser (e.g., VS-150 from Velvo-Clear) having an oscillation frequency of 50 kHz and an electrical output of 150 W, 2 minutes of dispersion treatment was carried out, thereby forming a dispersion for measurement. At this time, the temperature of the dispersion was suitably cooled to at least 10° C. and not above 40° C.

Measurement was carried out using the above-described flow particle image analyzer equipped with a standard object lens (10×), and using the particle sheath "PSE-900A" (Sysmex Corporation) as a sheath reagent. The dispersion prepared according to the procedure described above was introduced to the flow particle image analyzer and, in the HPF measurement mode, 3,000 toner particles were measured in the total count mode. Setting the binarization threshold during particle analysis to 85% and restricting the analyzed particle diameter to a circle-equivalent diameter of at least 0.60 μm and not more than 1.98 μm, the frequency % of particles having diameters in this range was determined and treated as the fines content.

The toner within the cartridge when 50,000 pages had been printed was sampled, and the fines content was evaluated. The results are shown in Table 6.

(Evaluation Criteria)

A: Fines content was less than 3.0 number %.
B: Fines content was at least 3.0 number % and less than 5.0 number %.
C: Fines content was at least 5.0 number % and less than 10.0 number %.
D: Fines content was at least 10.0 number % and less than 15.0 number %.
E: Fines content was 15.0 number % or more.

<Image Density Stability>

The above-described LBP 9200C was used to evaluate the image density. The cartridge used for evaluation was prepared by removing the toner contained in a commercial cartridge, cleaning out the interior with an air blower and then packing the empty cartridge with 260 g of the toner to be evaluated. This cartridge was loaded into the cyan station, dummy cartridges were loaded into the other stations, and evaluation was carried out.

In a high-temperature, high-humidity environment (30° C., 80% RH), images having a coverage ratio of 1% were continuously output in a print run of 50,000 pages while replenishing the toner every 10,000 pages.

Next, the toner loading on a solid image was adjusted to 0.30 mg/cm² and fixed images were created on color laser copier paper (Canon, Inc.).

The density of the images thus created were measured with a reflection densitometer (500 Series Spectrodensitometer) from X-Rite. Measurement was carried out at any five points on the image and, discarding the two points having the highest and lowest density, the average value for the remaining three points was determined. The results are shown in Table 6. In this invention, ratings of from A to C were regarded as indicative of a good image density stability.

(Evaluation Criteria)

A: Image density was 1.40 or more.
B: Image density was at least 1.30 and less than 1.40.
C: Image density was at least 1.20 and less than 1.30.
D: Image density was at least 1.15 and less than 1.20.
E: Image density was less than 1.15.

<Method of Evaluating Photoreceptor and Cleaning>

The durability was evaluated using a commercial printer (Canon LBP 9200C). The LBP 9200C makes use of monocomponent contact development and regulates the amount of toner on the image-bearing member with a toner regulating member. The cartridge used for evaluation was prepared by removing the toner contained in a commercial cartridge, cleaning out the interior with an air blower and then packing the empty cartridge with 260 g of the toner to be evaluated. This cartridge was loaded into the cyan station, dummy cartridges were loaded into the other stations, and evaluation was carried out.

In a high-temperature, high-humidity environment (30° C., 80% RH), images having a coverage ratio of 1% were output in a print run of 50,000 pages while replenishing the toner.

The amount of wear to the photoreceptor surface layer, damage to the photoreceptor surface layer, and the driving torque of the photoreceptor were evaluated when 50,000 pages had been printed. Measurement of the photoreceptor driving torque was carried out by attaching a torque meter to the moving portion of the printer photoreceptor. The results are shown in Table 6.

[Criteria for Evaluating Amount of Wear on Photoreceptor Surface Layer]

Measurement of the amount of wear on the photoreceptor surface layer was carried out by using an overcurrent-type film thickness gauge (Fischer Permascope, type E111) to measure the film thickness of the photoreceptor surface layer before and after outputting 50,000 printed pages. The difference in thickness was treated as the amount of wear in the photoreceptor. Measurement was carried out at ten points in the lengthwise direction of the photoreceptor, and the middle value was used.

A: Amount of wear on photoreceptor surface layer was less than 0.3 μm.
B: Amount of wear on photoreceptor surface layer was at least 0.3 μm and less than 0.5 μm.
C: Amount of wear on photoreceptor surface layer was at least 0.5 μm and less than 1.0 μm.
D: Amount of wear on photoreceptor surface layer was at least 1.0 μm and less than 1.5 μm.
E: Amount of wear on photoreceptor surface layer was 1.5 μm or more.

[Criteria for Evaluating Damage to Photoreceptor Surface Layer]

Damage to the photoreceptor surface layer was evaluated by checking the photoreceptor following the durability test for damage, and checking halftone images for image defects arising from damage to the photoreceptor surface layer when 50,000 pages have been output.

A: No damage observed in visual examination of photoreceptor surface layer.
B: Slight damage to the photoreceptor surface layer was confirmed on close examination.
C: Damage to the photoreceptor surface layer was confirmed, but image defects due to photoreceptor surface layer damage were not observed in halftone images.
D: Damage to the photoreceptor surface was confirmed, and image defects due to photoreceptor surface layer damage were observed in halftone images.
E: Streak-shaped damage on the photoreceptor surface was confirmed, and image defects due to photoreceptor surface layer damage were observed in halftone images.

[Criteria for Evaluating Photoreceptor Driving Torque]

A: Increase in photoreceptor drive torque, based on initial value, was less than 5.0%.
B: Increase in photoreceptor drive torque, based on initial value, was at least 5.0% but less than 10.0%.
C: Increase in photoreceptor drive torque, based on initial value, was at least 10.0% but less than 15.0%.
D: Increase in photoreceptor drive torque, based on initial value, was at least 15.0% but less than 20.0%.
E: Increase in photoreceptor drive torque, based on initial value, was 20.0% or more.

<Folding Resistance>

Images were output using a Canon LBP 5300 printer, and the folding resistance of the images was evaluated. The cartridge used for evaluation was prepared by removing the toner contained in a commercial cartridge, cleaning out the interior with an air blower and then packing the empty cartridge with the toner to be evaluated. This cartridge was left to stand for 24 hours in a normal temperature and humidity environment (23° C., 60% RH), after which it was loaded into the cyan station of the LBP 5300 and dummy cartridges were loaded into the other stations. Next, on GF-C157 high-whiteness paper (157 g/m²) sold by Canon Marketing Japan, Inc., the developing voltage was initially adjusted so that the toner loading on a solid image becomes 1.20 mg/cm², and fixed images having a size of 30 mm×30 mm were output.

Next, the fixed image was folded twice to create a crease in the shape of a cross and rubbed back-and-forth five times with a soft tissue (such as that available from Ozu Corporation under the trade name "Dusper") while applying a force of 4.9 kPa. This gave a sample in which toner had separated from the cross-shaped crease in the folded image, leaving the paper background visible in the crease.

Next, the cross-shaped crease was photographed with a CCD camera over a 512×512 pixel region at a resolution of 800 pixel/inch. The threshold was set to 60% and the image was binarized so that areas where the toner had separated from the paper were white regions. The smaller the surface area percentage of the white regions, the better the folding resistance. The results are shown in Table 6. In this invention, ratings of from A to C were regarded as indicative of a good folding resistance.

(Evaluation Criteria)

A: Surface area percentage of white regions was less than 1.0%.
B: Surface area percentage of white regions was at least 1.0% and less than 2.0%.
C: Surface area percentage of white regions was at least 2.0% and less than 3.0%.
D: Surface area percentage of white regions was at least 3.0% and less than 4.0%.
E: Surface area percentage of white regions was 4.0% or more.

<Evaluation of Percent Decrease in Triboelectric Charge Quantity of Toner with Continuous Shaking>

Evaluation of the toner was carried out as follows.

First, the toner and the carrier (a standard carrier of The Imaging Society of Japan: N-01, a spherical carrier composed of surface-treated ferrite cores) were placed, in respective amounts of 1.0 g and 19.0 g, in a plastic bottle and held for 24 hours in a normal temperature and humidity environment (23° C., 50% RH). The carrier and toner were then placed in a plastic bottle having a lid and shaken for 1 minute at a speed of 4 cycles per second using a shaking machine (YS-LD, from Yayoi Co., Ltd.), in this way producing a two-component developer composed of the toner and the carrier and also electrostatically charging the toner.

Figure 4:
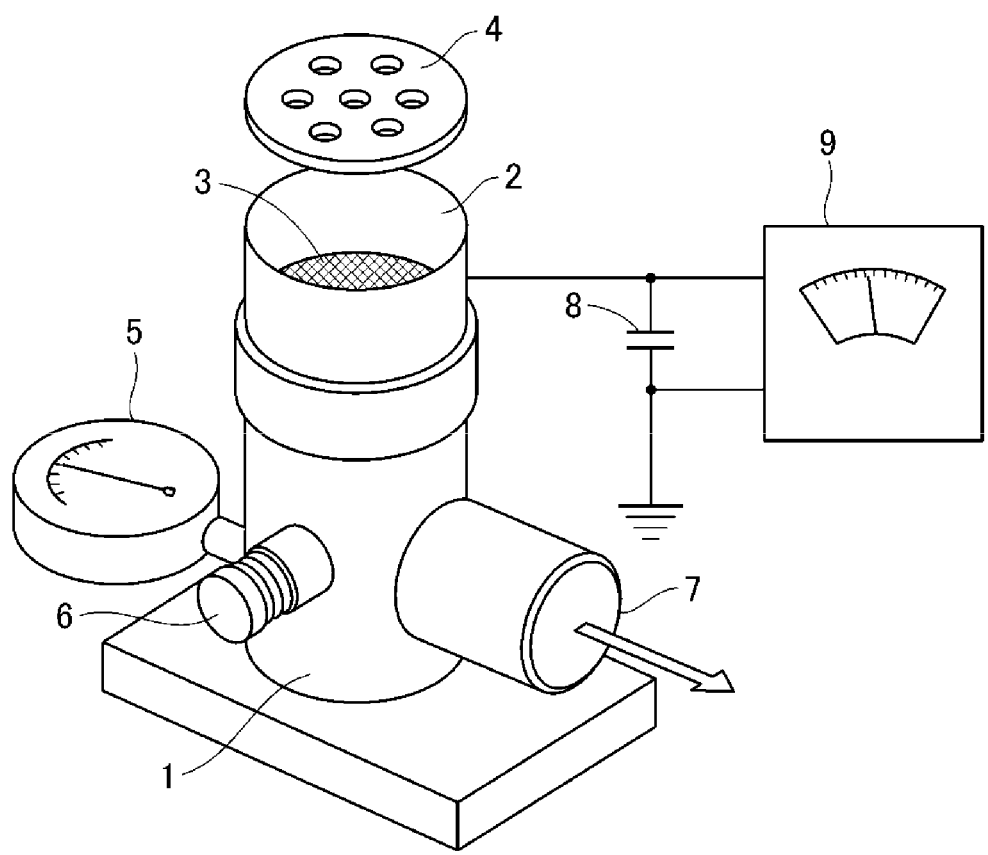
FIG. 4 is a schematic diagram of an apparatus for measuring the triboelectric charge quantity used for toner evaluation.

Next, the triboelectric charge quantity was measured using the measuring apparatus shown in FIG. 4. Referring to FIG. 4, about 0.5 g of the two-component developer was placed in a metal measuring vessel 2 having a 500-mesh screen 3 on the bottom, and a metal lid 4 was set on top. The mass of the entire measuring vessel at this time was weighed and the result was designated as W1 (kg). Next, in a suction device 1 (at least that portion of which is in contact with the measuring vessel 2 being an electrical insulator), suction was carried out through a suction port 7, the pressure at a vacuum gauge 5 being set to 2.5 kPa by adjusting an air quantity control valve 6. Suction was carried out in this state for 2 minutes, thereby aspirating and removing the toner within the developer. The potential on an electrometer 9 at this time was set in volts (V). Here, 8 is a capacitor having a capacitance of C (mF). The mass of the entire measuring vessel following aspiration was weighed and the result was designated as W2 (kg).

The triboelectric charge quantity Q(1) (mC/kg) when this sample had been shaken for 1 minute was calculated as indicated by formula (4) below.

$$Q(1)\,(mC/kg) = (C \times V)/(W1 - W2) \quad (4)$$

Similarly, the triboelectric charge quantity Q(30) when the sample had been shaken for 30 minutes at a speed of 4 cycles per second was also measured. The percent decrease in the triboelectric charge quantity was calculated as indicated by formula (5) below.

$$\text{Decrease in triboelectric charge quantity}\,(\%) = \{(Q(1) - Q(30))/Q(1)\} \times 100 \quad (5)$$

In this evaluation, the percent decrease in the triboelectric charge quantity is regarded as the degree of toner deterioration due to rubbing with the magnetic carrier. A lower percent decrease is thought to be indicative of a higher stress resistance. The results are shown in Table 6. In this invention, ratings of from A to C were regarded as indicative of a good charging performance.

(Evaluation Criteria)

A: Percent decrease in triboelectric charge quantity was less than 10%.
B: Percent decrease in triboelectric charge quantity was at least 10% and less than 15%.
C: Percent decrease in triboelectric charge quantity was at least 15% and less than 20%.
D: Percent decrease in triboelectric charge quantity was at least 20% and less than 25%.
E: Percent decrease in triboelectric charge quantity was 25% or more.

TABLE 6

|  | Toner | Heat-resistant storage stability 53° C./3 days | Fixing test | |
| --- | --- | --- | --- | --- |
|  |  |  | Low-temperature fixing performance ΔD(%) | High-temperature fixing temperature [° C.] |
| Example 1 | Toner 1 | A | A(1.8) | A(180) |
| Example 2 | Toner 2 | A | A(2.4) | A(180) |
| Example 3 | Toner 3 | A | A(1.6) | A(180) |
| Example 4 | Toner 4 | A | A(1.2) | B(170) |
| Example 5 | Toner 5 | A | A(2.1) | A(180) |
| Example 6 | Toner 6 | A | A(1.1) | B(170) |
| Example 7 | Toner 7 | A | A(1.5) | A(180) |
| Example 8 | Toner 8 | A | A(1.2) | B(170) |

TABLE 6-continued

| | Toner | | | |
|---|---|---|---|---|
| Example 9 | Toner 9 | A | A(1.5) | A(180) |
| Example 10 | Toner 10 | A | A(2.2) | A(180) |
| Example 11 | Toner 11 | A | A(1.2) | B(170) |
| Example 12 | Toner 12 | A | A(1.3) | B(170) |
| Example 13 | Toner 13 | A | A(2.3) | A(180) |
| Example 14 | Toner 14 | A | B(4.6) | C(160) |
| Example 15 | Toner 15 | C | A(2.6) | C(160) |
| Example 16 | Toner 16 | A | A(2.8) | A(180) |
| Example 17 | Toner 17 | A | A(2.9) | A(180) |
| Example 18 | Toner 18 | A | A(1.8) | A(180) |
| Example 19 | Toner 19 | A | A(2.1) | A(180) |
| Example 20 | Toner 20 | B | A(1.1) | B(170) |
| Example 21 | Toner 21 | A | A(1.2) | B(170) |
| Example 22 | Toner 22 | A | A(1.5) | A(180) |
| Example 23 | Toner 23 | B | A(1.2) | B(170) |
| Example 24 | Toner 24 | C | A(1.3) | B(170) |
| Example 25 | Toner 25 | B | B(3.2) | A(180) |
| Example 26 | Toner 26 | A | A(1.8) | A(180) |
| Example 27 | Toner 27 | C | C(7.1) | A(180) |
| Example 28 | Toner 28 | A | A(1.8) | A(180) |
| Example 29 | Toner 29 | A | C(5.2) | A(180) |
| Example 30 | Toner 30 | A | A(0.9) | C(160) |
| Comparative Example 1 | Toner 31 | A | A(2.7) | A(180) |
| Comparative Example 2 | Toner 32 | A | A(0.9) | E(145) |
| Comparative Example 3 | Toner 33 | C | B(4.7) | C(160) |
| Comparative Example 4 | Toner 34 | B | A(1.2) | B(170) |
| Comparative Example 5 | Toner 35 | A | C(5.6) | E(145) |
| Comparative Example 6 | Toner 36 | A | B(4.8) | A(180) |
| Comparative Example 7 | Toner 37 | A | A(0.9) | E(145) |
| Comparative Example 8 | Toner 38 | A | B(4.6) | A(180) |
| Comparative Example 9 | Toner 39 | A | A(0.3) | E(145) |
| Comparative Example 10 | Toner 40 | B | A(0.7) | C(160) |
| Comparative Example 11 | Toner 41 | C | D(8.2) | A(180) |
| Comparative Example 12 | Toner 42 | B | C(6.2) | A(180) |
| Comparative Example 13 | Toner 43 | E | E(10.3) | A(180) |
| Comparative Example 14 | Toner 44 | D | E(11.5) | A(180) |
| Comparative Example 15 | Toner 45 | E | E(12.6) | A(180) |

| | | Durability properties | | | | Image stability Folding | Electrostatic stability Charge |
|---|---|---|---|---|---|---|---|
| | Toner | Increase in fines Evaluation (fines (number %)) | Image density | Increase in driving torque (%) | Drum wear Evaluation (amount of wear (μm)) | Drum damage Image evaluation | evaluation Evaluation (surface area ratio of white regions (%)) | quantity Evaluation (percent decrease (%)) |
| Example 1 | Toner 1 | A(1.8) | A(1.41) | A(2.1) | A(0.2) | A | A(0.5) | A(7) |
| Example 2 | Toner 2 | A(1.9) | A(1.45) | A(2.2) | B(0.4) | B | B(1.5) | A(5) |
| Example 3 | Toner 3 | A(2.0) | A(1.41) | A(2.3) | A(0.2) | A | A(0.5) | B(10) |
| Example 4 | Toner 4 | B(3.2) | B(1.35) | A(3.1) | A(0.2) | A | A(0.5) | B(12) |
| Example 5 | Toner 5 | A(1.7) | A(1.45) | A(2.2) | B(0.4) | B | B(1.2) | A(7) |
| Example 6 | Toner 6 | B(3.0) | B(1.34) | A(2.3) | A(0.2) | A | A(0.5) | B(12) |
| Example 7 | Toner 7 | A(1.9) | A(1.41) | A(2.3) | B(0.3) | B | B(1.2) | B(10) |
| Example 8 | Toner 8 | B(3.0) | B(1.33) | A(3.2) | A(0.2) | A | A(0.5) | B(12) |
| Example 9 | Toner 9 | A(2.0) | A(1.42) | A(2.1) | A(0.2) | A | A(0.5) | B(10) |
| Example 10 | Toner 10 | A(1.6) | A(1.45) | A(2.4) | B(0.4) | B | B(1.5) | A(7) |
| Example 11 | Toner 11 | A(2.1) | A(1.43) | A(2.3) | B(0.3) | B | B(1.2) | B(12) |
| Example 12 | Toner 12 | B(3.0) | B(1.34) | A(3.3) | A(0.2) | A | A(0.5) | B(12) |
| Example 13 | Toner 13 | A(1.6) | A(1.45) | A(2.5) | B(0.4) | B | B(1.5) | A(7) |
| Example 14 | Toner 14 | B(3.0) | B(1.33) | A(3.1) | A(0.2) | A | A(0.5) | A(5) |
| Example 15 | Toner 15 | A(1.6) | A(1.45) | A(2.1) | B(0.4) | B | B(1.7) | B(14) |
| Example 16 | Toner 16 | A(1.1) | A(1.51) | A(1.6) | C(0.7) | C | C(2.2) | A(3) |
| Example 17 | Toner 17 | A(1.1) | A(1.52) | A(1.7) | C(0.7) | C | C(2.2) | A(3) |
| Example 18 | Toner 18 | A(2.2) | A(1.41) | A(2.1) | A(0.2) | A | A(0.5) | A(7) |
| Example 19 | Toner 19 | A(2.3) | A(1.43) | A(2.1) | B(0.4) | B | B(1.7) | A(7) |
| Example 20 | Toner 20 | C(5.1) | C(1.25) | C(12.1) | A(0.1) | A | A(0.5) | B(12) |
| Example 21 | Toner 21 | A(2.1) | A(1.41) | A(2.2) | B(0.4) | B | B(1.5) | B(12) |
| Example 22 | Toner 22 | A(2.2) | A(1.42) | A(2.1) | B(0.4) | B | B(1.2) | B(10) |
| Example 23 | Toner 23 | C(5.2) | C(1.24) | C(10.3) | A(0.1) | A | A(0.5) | B(12) |
| Example 24 | Toner 24 | B(4.1) | B(1.33) | B(8.3) | A(0.1) | A | A(0.5) | B(12) |
| Example 25 | Toner 25 | B(4.3) | B(1.33) | B(7.1) | A(0.1) | A | A(0.5) | A(3) |
| Example 26 | Toner 26 | A(2.1) | A(1.40) | A(2.3) | B(0.4) | B | B(1.2) | A(7) |
| Example 27 | Toner 27 | C(7.1) | C(1.21) | C(14.5) | A(0.1) | A | A(0.5) | A(3) |
| Example 28 | Toner 28 | B(3.2) | B(1.34) | A(2.1) | A(0.2) | A | A(0.5) | B(12) |
| Example 29 | Toner 29 | B(3.3) | B(1.35) | A(2.2) | A(0.2) | A | A(0.5) | A(5) |
| Example 30 | Toner 30 | C(7.4) | C(1.21) | C(14.3) | A(0.1) | A | A(0.5) | C(17) |
| Comparative Example 1 | Toner 31 | A(1.1) | A(1.51) | A(1.5) | E(1.7) | E | E(5.0) | A(4) |
| Comparative Example 2 | Toner 32 | B(4.2) | B(1.32) | B(7.1) | A(0.1) | A | A(0.5) | D(22) |

TABLE 6-continued

| | | | | | | | | |
|---|---|---|---|---|---|---|---|---|
| Comparative Example 3 | Toner 33 | A(1.1) | A(1.51) | A(1.6) | E(1.7) | E | E(5.0) | A(5) |
| Comparative Example 4 | Toner 34 | A(2.2) | A(1.51) | A(2.5) | B(0.4) | B | B(1.2) | D(20) |
| Comparative Example 5 | Toner 35 | B(4.1) | B(1.31) | B(5.5) | A(0.1) | A | A(0.5) | B(10) |
| Comparative Example 6 | Toner 36 | A(1.2) | A(1.51) | A(1.2) | D(1.4) | D | E(4.5) | A(4) |
| Comparative Example 7 | Toner 37 | B(4.3) | B(1.32) | B(8.1) | A(0.1) | A | A(0.5) | D(22) |
| Comparative Example 8 | Toner 38 | A(1.1) | A(1.51) | A(1.3) | E(1.5) | E | E(5.0) | A(4) |
| Comparative Example 9 | Toner 39 | C(5.0) | C(1.25) | B(8.1) | A(0.1) | A | A(0.5) | D(22) |
| Comparative Example 10 | Toner 40 | D(10.6) | D(1.16) | D(16.3) | A(0.1) | A | A(0.5) | C(15) |
| Comparative Example 11 | Toner 41 | A(1.3) | A(1.49) | A(1.1) | E(2.0) | E | E(5.0) | A(3) |
| Comparative Example 12 | Toner 42 | C(5.1) | C(1.27) | A(1.2) | E(1.8) | E | E(5.0) | A(3) |
| Comparative Example 13 | Toner 43 | E(17.1) | E(1.06) | A(1.3) | E(1.5) | E | E(5.0) | A(3) |
| Comparative Example 14 | Toner 44 | E(15.2) | E(1.11) | A(1.4) | E(2.0) | E | E(6.0) | A(3) |
| Comparative Example 15 | Toner 45 | E(17.3) | E(1.05) | A(1.5) | D(1.3) | D | E(4.5) | A(3) |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-070171, filed Mar. 28, 2014, which is hereby incorporated by reference herein in its entirety.

What is claimed is:

1. A toner comprising a toner particle containing a binder resin, wherein
the binder resin comprises a block polymer as a main component, the block polymer being obtained by chemically bonding a crystalline polyester resin with an amorphous polyurethane resin, wherein;
the binder resin
comprises from 50.0 mass % to 85.0 mass % of a crystalline polyester resin component, and
has a concentration of ester bonds derived from the crystalline polyester resin component of not more than 5.2 mmol/g, and wherein;
in a three-point bending test on a toner specimen obtained by melting the toner and molding the same to a length (1) of 30.0 mm, a width (w) of 13.0 mm and a thickness (t) of 4.0 mm, the test being carried out at a span (L) between specimen support points of 15.0 mm, when the maximum bending stress of the toner specimen determined by formula (1) below from the maximum load $F_{MAX}$ (N) measured at a temperature of 25° C. is $\sigma_{MAX}$ (MPa)

$$\sigma_{MAX} = (3 \times F_{MAX} \times L)/(2 \times w \times t^2) \tag{1}$$

and when the maximum value of the flexural elasticity modulus E of the toner specimen determined by formula (2) below from the slope $\Delta F/\Delta s$ of a load/deflection curve is $E_{MAX}$(MPa)

$$E = L^3/(4 \times w \times t^3) \times (\Delta F/\Delta s) \tag{2},$$

$E_{MAX}$ is from 200 MPa to 450 MPa, and
the strain energy u per unit volume calculated by formula (3) below from $\sigma_{MAX}$ and $E_{MAX}$ is at least 0.30 MPa $$u = \sigma_{MAX}^2/(2 \times E_{MAX}) \tag{3}$$

(where $\Delta F(N)$ representing a change in load between any two points selected so that the change in deflection $\Delta s$ becomes 0.2 mm).

2. The toner according to claim 1, wherein the ratio of the urethane bond concentration to the ester bond concentration in the block polymer (urethane bond concentration/ester bond concentration) is from 0.20 to 0.35.

3. The toner according to claim 1, wherein in addition to the block polymer, the binder resin further contains a polyester resin, and the content of the polyester resin is from 5.0 mass % to 40.0 mass % of the binder resin.

4. The toner according to claim 3, wherein the polyester resin is a crystalline polyester resin.

5. The toner according to claim 1, which is produced by steps of:
a) preparing a resin solution by mixing a binder resin with an organic solvent capable of dissolving the binder resin;
b) forming drops of the resin solution by mixing the resin solution with a carbon dioxide-containing dispersion medium in which a dispersing agent has been dispersed; and
c) obtaining toner particles by removing the organic solvent included in the drops of the resin solution.

* * * * *